United States Patent [19]

Asada et al.

[11] Patent Number: 5,651,289
[45] Date of Patent: Jul. 29, 1997

[54] DRIVE TRANSMISSION SYSTEM FOR WORKING VEHICLE

[75] Inventors: Akihiro Asada; Akio Inamori; Kazushige Komori; Shigeo Sakamoto; Hironobu Kubota, all of Sakai, Japan

[73] Assignee: Kubota Corporation, Japan

[21] Appl. No.: 453,511

[22] Filed: May 23, 1995

[30] Foreign Application Priority Data

Jul. 8, 1994 [JP] Japan .................................. 6-157694
Jul. 8, 1994 [JP] Japan .................................. 6-157696

[51] Int. Cl.$^6$ .................................................. B60K 20/00
[52] U.S. Cl. ............................................. 74/335; 74/336 R
[58] Field of Search .................................. 74/335, 336 R, 74/745; 477/70, 79, 77, 86; 192/3.58, 87.13

[56] References Cited

U.S. PATENT DOCUMENTS

| | | | |
|---|---|---|---|
| 4,993,285 | 2/1991 | Asayama et al. | 74/335 |
| 5,113,720 | 5/1992 | Asayama et al. | 74/335 |
| 5,172,603 | 12/1992 | Macinnis | 74/335 |
| 5,407,042 | 4/1995 | Fukui et al. | 192/3.58 |
| 5,429,005 | 7/1995 | Fukui et al. | 74/325 |
| 5,487,004 | 1/1996 | Amsallen | 74/336 R X |

FOREIGN PATENT DOCUMENTS

| | | | |
|---|---|---|---|
| 3-66975 | 3/1991 | Japan | 74/335 |
| 439464 | of 1992 | Japan . | |
| 6-221427 | 8/1994 | Japan | 74/335 |

*Primary Examiner*—Khoi Q. Ta
*Attorney, Agent, or Firm*—Webb Ziesenheim Bruening Logsdon Orkin & Hanson, P.C.

[57] ABSTRACT

A drive transmission system for a working vehicle for transmitting power of an engine to running devices through a main clutch, a main change speed device and an auxiliary change speed device is disclosed. The main change speed device includes a first group of hydraulic clutches and a group of control valves for operating these clutches. The auxiliary change speed device includes a second group of hydraulic clutches and control valves for operating these clutches. Pressure oil is supplied to selected clutches of the first and second groups of hydraulic clutches to obtain the desired speed. The drive transmission system includes a shifter mechanism for transmitting a shift command to the main and auxiliary change speed devices; a first controller operable in response to the shift command to operate one of the first control valves to a drain position which was placed in a supply position prior to transmission of the shift command, and to operate to a supply position a different one of the first control valves corresponding to the shift command; and a second controller operable in response to the shift command to operate one of the second control valves to a drain position which was placed in a supply position, and thereafter to operate one of the second control valves gradually to a supply position.

8 Claims, 19 Drawing Sheets

DRIVE TRANSMISSION SYSTEM FOR WORKING VEHICLE

FIELD OF THE INVENTION

The present invention relates to a drive transmission system for a working vehicle.

DESCRIPTION OF THE RELATED ART

Some working vehicles are equipped with a drive transmission of the hydraulic clutch type. This type of transmission includes a plurality of multidisk hydraulic clutches arranged in parallel. A shifting operation is effected by supplying pressure oil to one of the hydraulic clutches to place this clutch in an engaged position.

Each of the hydraulic clutches corresponds to one shift position of the drive transmission. When this transmission is shifted, the hydraulic clutch used before the shift command is disengaged, and .working pressure is gradually increased for the hydraulic clutch corresponding to the shift command to engage this clutch, to effect a smooth shifting operation with little shock. With a working vehicle having such a drive transmission, there is room of improvement for realizing a smoother shifting operation with less shock while increasing the number of speed stages.

SUMMARY OF THE INVENTION

The object of the present invention is to provide a drive transmission structure of the hydraulic clutch type for a working vehicle, which effects a smooth shifting operation with less shock, while making an increased number of speed stages available.

The above object is fulfilled, according to the present invention, by a drive transmission system for a working vehicle for transmitting power of an engine to running devices through a main clutch, a main change speed device and an auxiliary change speed device, the main change speed device including a first group of hydraulic clutches, and a group of control valves for operating these clutches, the auxiliary change speed device including second hydraulic clutches, and second control valves for operating these clutches, pressure oil being supplied to selected clutches of the first group hydraulic clutches and the second hydraulic clutches to obtain a desired speed, the drive transmission system comprising:

(A) shifter means for transmitting shift command to the main change speed device and the auxiliary change speed device;

(B) first control means operable in response to the shift command to operate, to a drain position, one of the first control valves placed in a supply position prior to transmission of the shift command, and to operate, to a supply position, a different one of the first control valves corresponding to the shift command; and (C) second control means operable in response to the shift command to operate, to a drain position, one of the second control valves placed in a supply position, and thereafter to operate the one of the second control valves gradually to a supply position.

As noted above, the auxiliary change speed device of the hydraulic clutch type is disposed downstream of the main change speed device of the hydraulic clutch type. The main change speed device and auxiliary change speed device in combination provide the number of speeds corresponding to a product of the number of speeds of the main change speed device and the number of speeds of the auxiliary change speed device. Thus, a large number of shift positions are established.

For example, a shift command is transmitted from the shift means, one of the clutch control valves of the main change speed device transmitting power is operated to the drain position, whereby the hydraulic clutch disengaged. At the same time, the control valve of the hydraulic clutch corresponding to the shift command is operated to the oil supply position, to engage the hydraulic clutch.

The control valve of the hydraulic clutch of the auxiliary change speed device is operated to the drain position simultaneously with the above shifting operation of the main change speed device. As a result, this hydraulic clutch of the auxiliary change speed device is disengaged. The control valve of the hydraulic clutch of the auxiliary change speed device is operated gradually to the oil supply position (with the working pressure gradually increased). Thus, the hydraulic clutch of the auxiliary change speed device is engaged.

The auxiliary change speed device is disposed closer than the main change speed device to the running devices (wheels or the like). Consequently, the power transmitted from the main change speed device to the auxiliary change speed device is slower and has a higher torque than the power transmitted from the main clutch to the main change speed device.

Thus, even if minor torque variations should occur in the auxiliary change speed device when the working pressure of the hydraulic clutch of the auxiliary change speed device is increased gradually, the hydraulic clutch of the auxiliary change speed device would readily slip to absorb the torque variations reliably without allowing the variations to be felt as transmission shock.

As described above, the auxiliary change speed device of the hydraulic clutch type is disposed downstream of the main change speed device of the hydraulic clutch type. When the main change speed device is shifted, the hydraulic clutch of the auxiliary change speed device is engaged gradually. Thus, even small torque variations can be absorbed reliably to promote the shifting performance of the working vehicle. The auxiliary change speed device in series arrangement with the main change speed device provides a large number of shift positions.

BRIEF DESCRIPTION OF THE DRAWINGS

FIG. 4 is a hydraulic circuit diagram including a main change speed device and a first auxiliary change speed device, and so on.

DETAILED DESCRIPTION OF THE PREFERRED EMBODIMENT

An embodiment of the present invention will be described hereinafter with reference to the drawings.

(I) Working Vehicle and Transmission Structure

Figure 1:
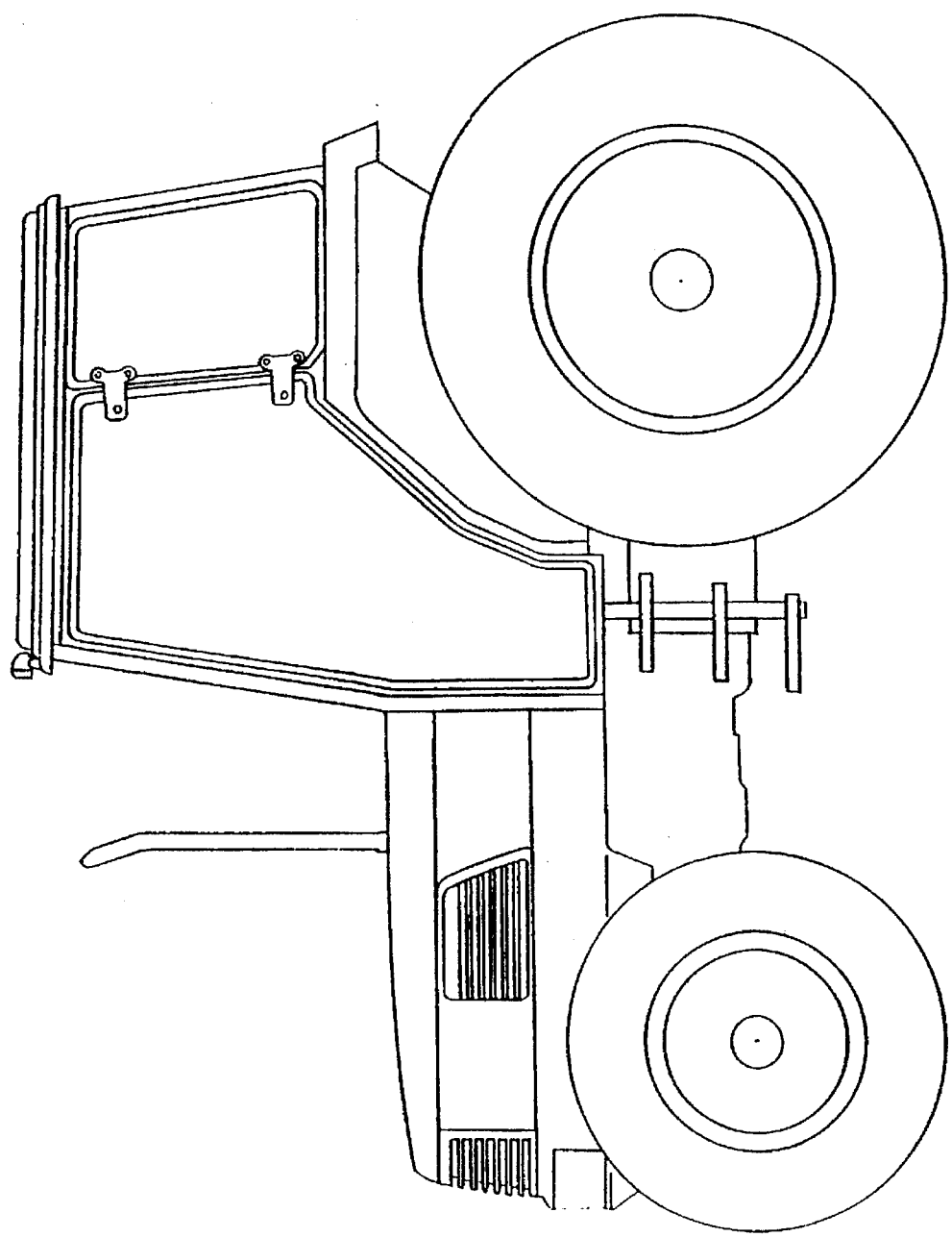
FIG. 1 is a side elevation of a working vehicle to which the present invention is applied.

FIG. 1 shows a side elevation of an agricultural tractor as one example of working vehicles to which the present invention is applicable.

Figure 2:
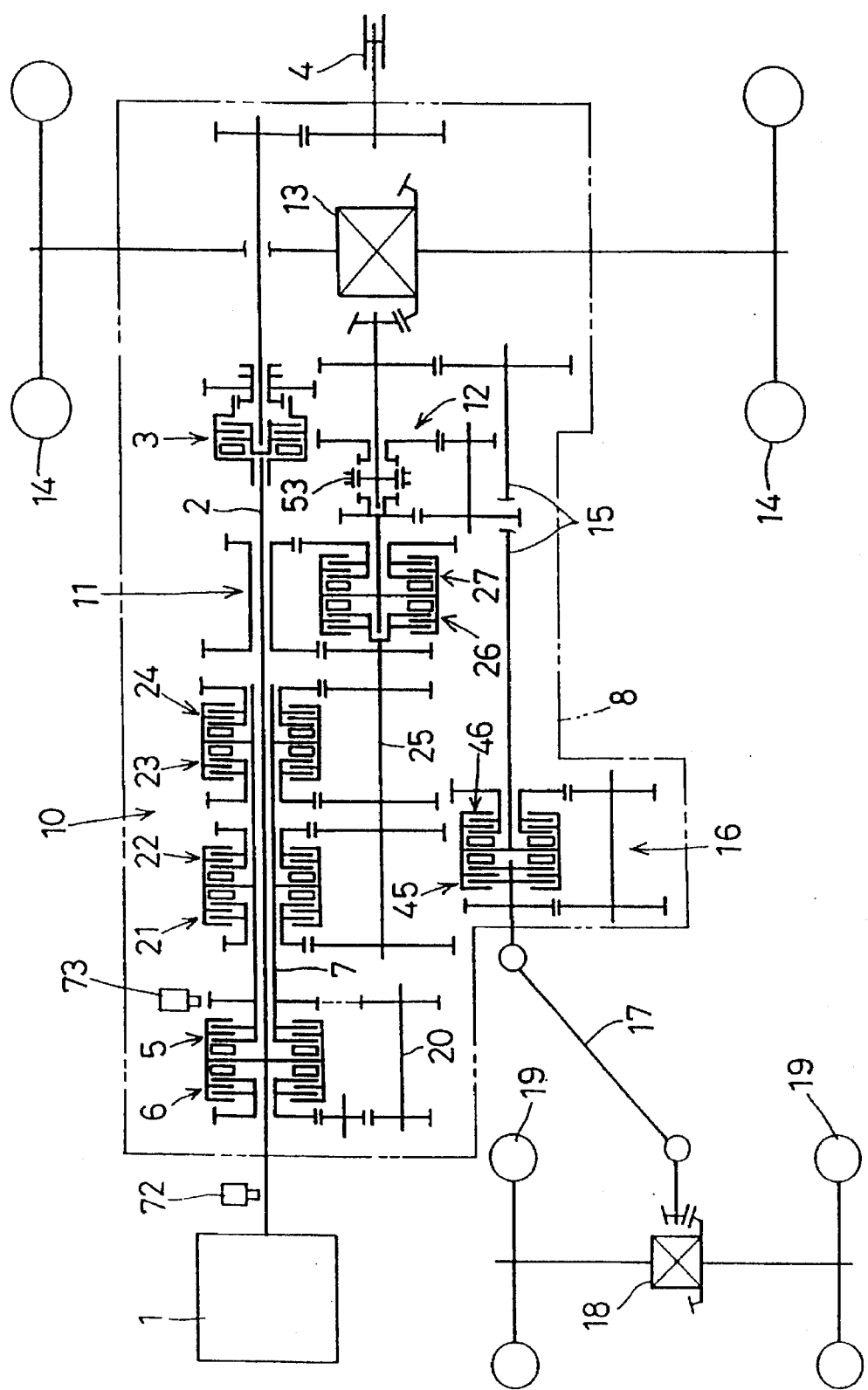
FIG. 2 is a schematic view of a transmission system in a transmission case.

FIG. 2 shows the interior of a transmission case 8 of the agricultural tractor of FIG. 1. Power of an engine 1 is transmitted to a PTO shaft 4 through a transmission shaft 2 and a hydraulic multidisk PTO clutch 3.

Power of engine 1 is transmitted also to right and left rear wheels 14 (corresponding to a running device) through a forward drive clutch 5 (corresponding to a main clutch) or a backward drive clutch 6 (corresponding to the main clutch), a sleeve shaft 7, a main change speed device 10, a first auxiliary change speed device 11 (corresponding to an auxiliary change speed device), a second auxiliary change speed device 12 and a rear differential 13. Power branched off immediately upstream of the rear differential 13 is transmitted to right and left front wheels 19 (corresponding to a running device) through a transmission shaft 15, a front wheel transmission 16 of the hydraulic clutch type, a front wheel transmission shaft 17 and a front differential 18.

Each of the forward drive clutch 5 and backward drive clutch 6 is the hydraulic multidisk type having a combination of friction plates (not shown) and a piston (not shown), which is operated to an engaged position by pressure oil supplied thereto. When the forward drive clutch 5 is operated to the engaged position, the power of engine 1 is transmitted from the forward drive clutch 5 directly to the sleeve shaft 7 to drive the tractor forward. When the backward drive clutch 6 are operated to the engaged position, the power of engine 1 is transmitted to the sleeve shaft 7 in reversed state through the backward drive clutch 6 and transmission shaft 20 to drive the tractor backward.

The main change speed device 10 is the hydraulic clutch type including four hydraulic multidisk clutches arranged in parallel, which are a first speed clutch 21 (corresponding to a hydraulic clutch), a second speed clutch 22 (corresponding to a hydraulic clutch), a third speed clutch 23 (corresponding to a hydraulic clutch) and a fourth speed clutch 24 (corresponding to a hydraulic clutch), to provide four speeds. By selectively operating the first to fourth speed clutches 21–24 to an engaged position, power is transmitted in four speeds from the sleeve shaft 7 interlocked to the engine 1 to a transmission shaft 25 downstream of the main change speed device 10.

The first auxiliary change speed device 11 is the hydraulic clutch type including two hydraulic multidisk clutches arranged in parallel, which are a low speed clutch 26 (corresponding to a hydraulic clutch) and a high speed clutch 27 (corresponding to a hydraulic clutch), to provide two speeds. By selectively operating the high speed and low speed clutches 26 and 27 to an engaged position, power is transmitted in two speeds from the transmission shaft 25 interlocked to the main change speed device 10 to the second auxiliary change speed device 12 downstream of the first auxiliary change speed device 11.

The second auxiliary change speed device 12 is the synchromesh type including a slidable shift member 53 to provide two speeds. The shift member 53 is mechanically operable by a shift lever 28 described later.

(II) Hydraulic Circuit for Forward Drive and Backward Drive Clutches and Main Change Speed Device A hydraulic circuit for the forward drive and backward drive clutches 5 and 6 and the main change speed device 10 will be described next.

Figure 4:
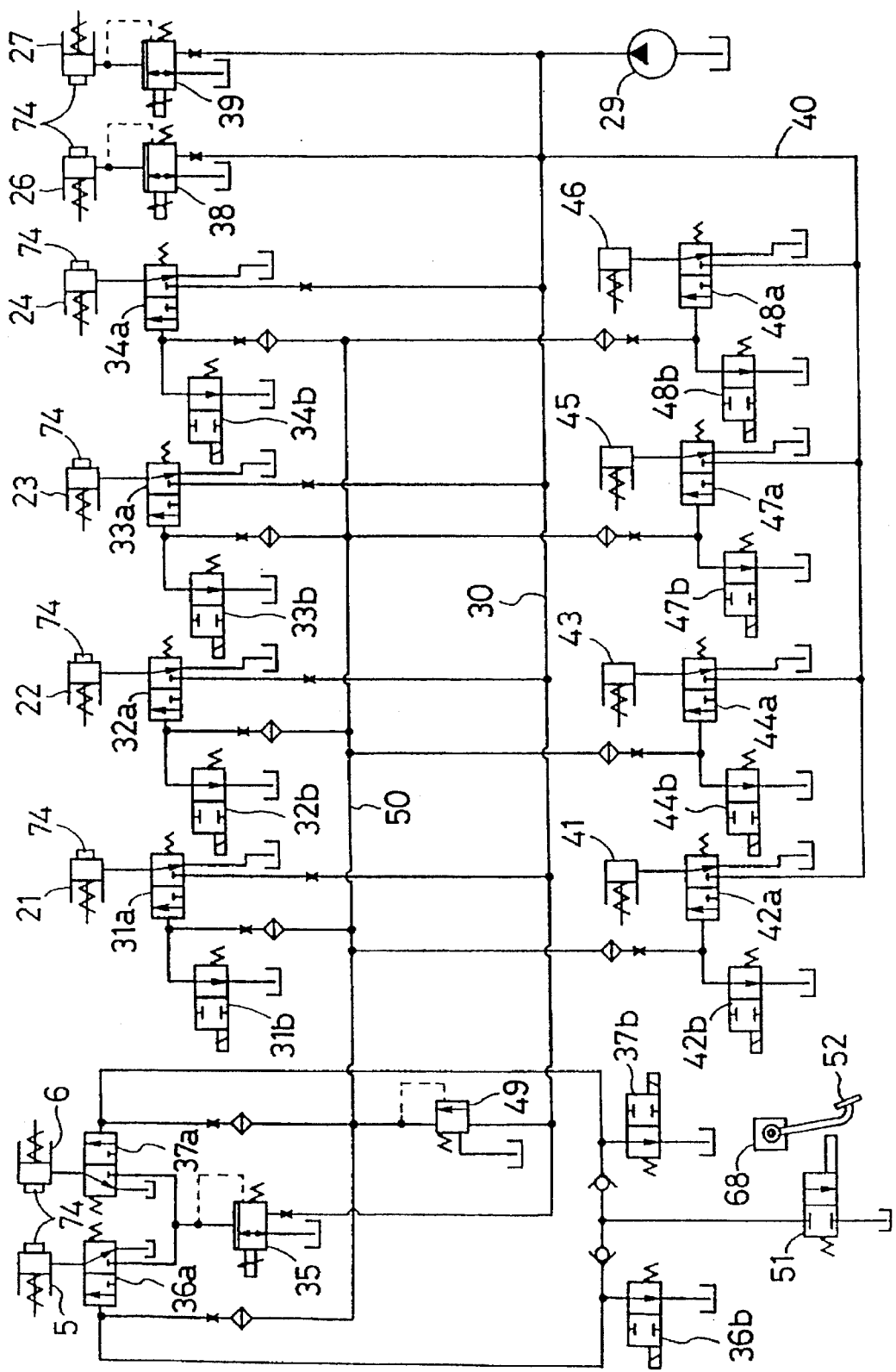

As shown in FIG. 4, an oil line 30 extending from a pump 29 has, connected in parallel, an electromagnetic proportional valve 35 and pilot-operated changeover valves 36a and 37a for controlling the forward drive and backward drive clutches 5 and 6, pilot-operated changeover valves 31a, 32a, 33a and 34a (corresponding to a first group of changeover valves) for controlling the first to fourth speed clutches 21–24 (corresponding to a first group of hydraulic clutches) of main change speed device 10, electromagnetic proportional valves 38 and 39 (corresponding to control valves) for controlling the low speed clutch 26 (corresponding to a second hydraulic clutch) high speed clutch 27 (corresponding to the second hydraulic clutch) of the first auxiliary change speed device 11.

An oil line 40 branched from the oil line 30 has, connected in parallel, a pilot-operated changeover valve 42a for controlling a hydraulic clutch 41 to lock the front differential 18, a pilot-operated changeover valve 44a for controlling a hydraulic clutch 43 to lock the rear differential 13, and pilot-operated changeover valves 47a and 48a for controlling a standard clutch 45 and an accelerating clutch 46 (FIG. 2) of front wheel transmission 16. The changeover valves 31a to 34a (corresponding to a first group of changeover valves), 36a (corresponding to a second changeover valve), 37a (corresponding to the second changeover valve), and 42a, 44a, 47a and 48a are spring-loaded to drain positions (disengaged positions of the clutches). These valves are operated to supply positions (engaged positions of the clutches) by pilot pressure oil supplied thereto as described later.

A pilot oil line 50 is branched from the oil line 30 through a reducing valve 49. This pilot oil line 50 is connected to control portions of changeover valves 31a–34a, 36a, 37a, 42a, 44a, 47a and 48a. The control portions are connected to electromagnetic control valve 31b (corresponding to a control valve), 32b (corresponding to a control valve), 33b (corresponding to a control valve), 34b (corresponding to a control valve), 36b, 37b, 42b, 44b, 47b and 48b.

The electromagnetic control valves 31b to 34b (corresponding to a first group of control valves), 36b, 37b, 42b, 44b, 47b and 48b are spring-loaded to drain positions (engaged positions). When these valves are electrically operated to supply positions, pilot pressure oil is supplied to the operation portions of changeover valves 31a–34a, 36a, 37a, 42a, 44a, 47a and 48a, to operate these valves to supply positions (engaged positions).

Figure 3:
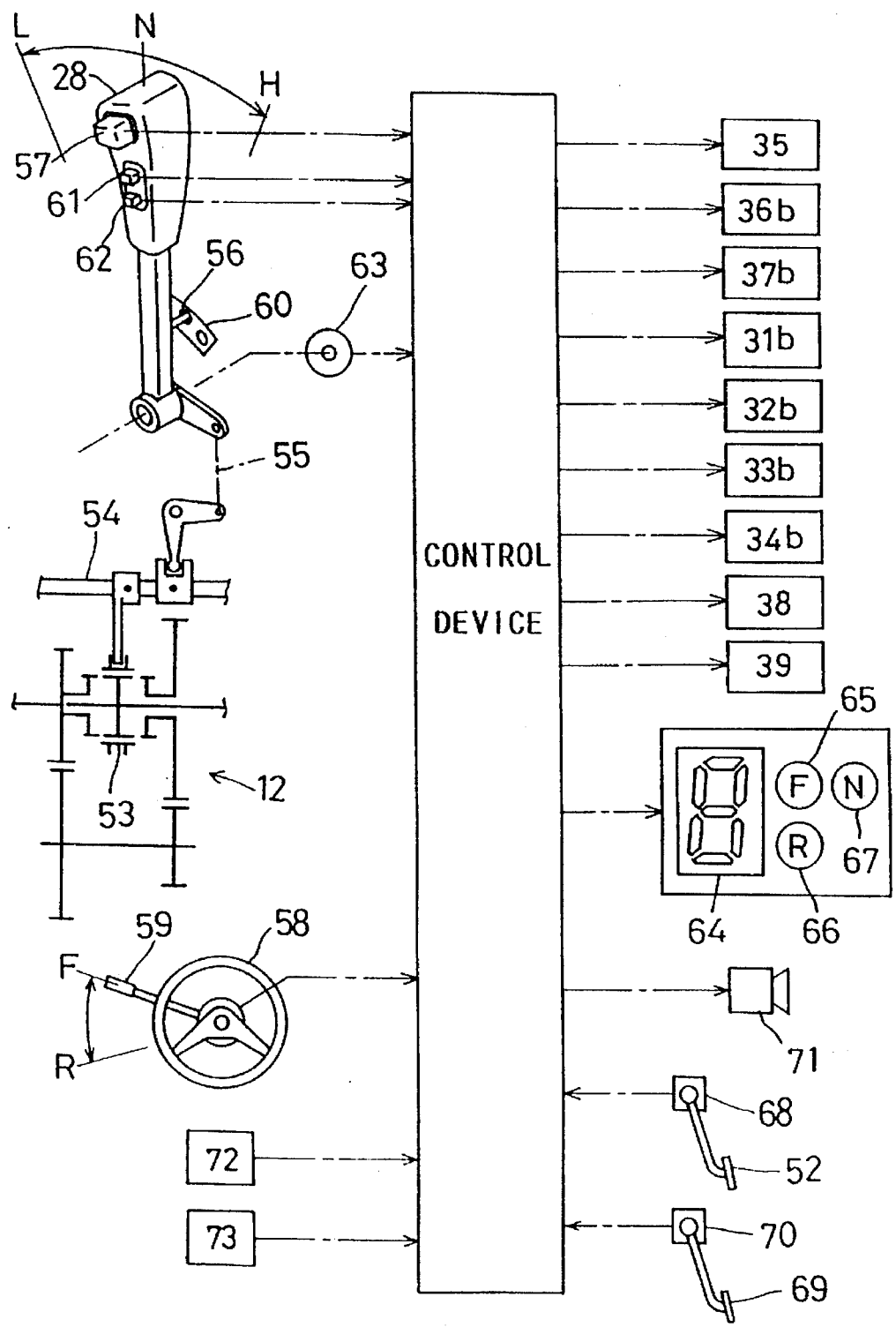
FIG. 3 is a view showing an interlocked state of a shift lever and a second auxiliary change speed device, and interlocked state of a speed indicator and other components.

III Control of Forward Drive and Backward Drive Clutches and Main Change Speed Device The constructions of the control portions the forward drive and backward drive clutches 5 and 6 and the main change speed device 10 will be described next. As shown in FIGS. 3 and 4, a switch valve 51 is provided to drain pilot pressure oil from the control portions of changeover valves 36a and 37a of forward drive and backward drive clutches 5 and 6. The switch valve 51 is spring-loaded to a closed position. A clutch pedal 52 is provided to operate the switch valve 51 to an open position mechanically. The clutch pedal 52 has a position sensor 68 for detecting a control position thereof. A forward and backward drive lever 59 is provided at a proximal portion of a steering wheel 58 for steering the front wheels 19. This lever 59 transmits electric forward drive and backward drive signals. An accelerator pedal 69 is provided to be manually operable to vary accelerated positions of engine 1. A position sensor 70 is provided to detect a control position of the accelerator pedal 69.

As shown in FIG. 3, the shift lever 28 is supported to be pivotable about a cross axis in a driver's section of the tractor. The shift lever 28 is connected mechanically through an interlocked mechanism 55 to a shift fork 54 for sliding the shift member 53 of the second auxiliary change speed device 12 (FIG. 2). The second auxiliary change speed device 12 is shiftable by operating the shift lever 28 to three positions; a neutral position N, a low speed position L and a high speed position H.

The shift lever 28 is disposed in a right forward position of a driver's seat (not shown) in the driver's section. The cross axis of shift lever 28 is inclined longitudinally of the tractor with respect to the transverse direction of the tractor. Consequently, the shift lever 28 is pivotable obliquely rightward and forward to low speed position L, and obliquely leftward and backward (toward the center of the tractor) to high speed position H.

The shift lever 28 includes a projectable and retractable lock pin 56 provided laterally thereof, and a control pin 57 disposed in upper position of the shift lever 28 for projecting and retracting the lock pin 56. The lock pin 56 is spring-loaded to project to a fixed position rightward in FIG. 3 (the control pin 57 being biased to a projecting position leftward in FIG. 3). The lock pin 28 is engageable with a fixed guide plate 60 to lock the shift lever 28 to neutral position N, low speed position L or high speed position H. When the control pin 57 is depressed, the lock pin 56 is retracted to a release position leftward in FIG. 3, for allowing the shift lever 28 to be operated to neutral position N, low speed position L or high speed position H. The shift lever 28 further includes a position sensor 63 for detecting a control position thereof.

The shift lever 28 has a shift-up button 61 (corresponding to a shift controller) and a shift-down button 62 (corresponding to a shift controller) arranged vertically on a left side surface of shift lever 28. When the shift-up button 61 or shift-down button 62 is pushed once, one shift-up signal (corresponding to a shift command) or shift-down signal (corresponding to a shift command) is transmitted to shift the main and first auxiliary change speed devices 10 and 11 shown in FIG. 2.

As shown in FIG. 3, the driver's section includes a 7-segment speed indicator 64 for indicating a shift position of the main and first auxiliary change speed devices 10 and 11 (first to eighth speeds), a forward drive lamp 65 and a backward drive lamp 66 for indicating which of the forward drive and backward drive clutches 5 and 6 is operated to the engaged position by the forward and backward drive lever 59, and a neutral lamp 67 for indicating that the shift lever 28 is operated to neutral position N. As shown in FIG. 4, pressure sensors 74 are provided to detect whether the working pressure of forward drive and backward drive clutches 5 and 6 has reached a predetermined pressure for drive transmission. The forward drive and backward drive lamps 65 and 66 are lit based on detection of these pressure sensors 74.

(IV) Shift-Up and Shift-Down

Shifting operations by the shift-up button 61 and shift-down button 62 of shift lever 28 and abnormality detection effected during the shifting operations will be described next.

Figure 5A:
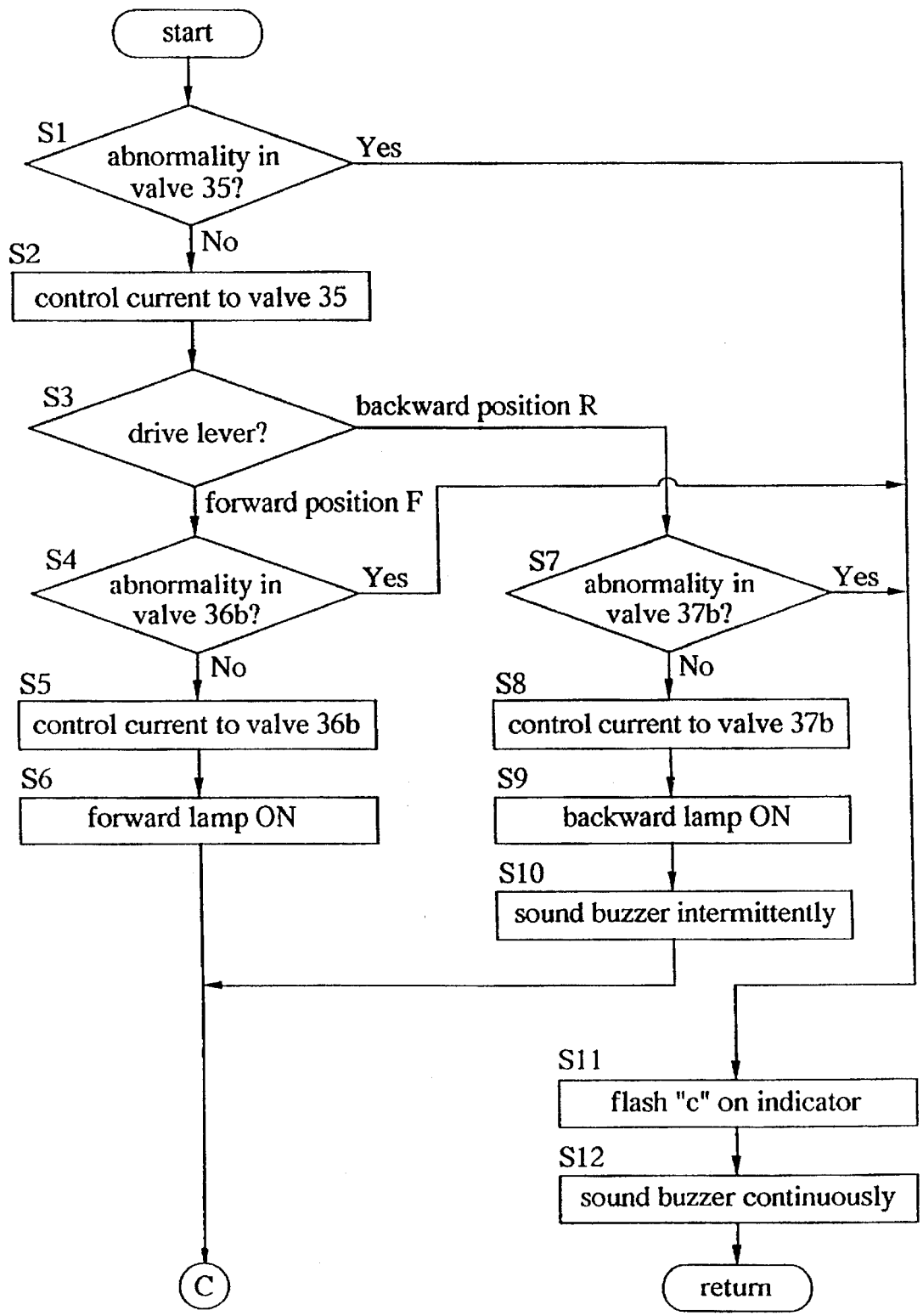
FIG. 5 is a flowchart of a first half of a control sequence for a shifting operation effected by pressing a shift-up button or shift-down button and for abnormality detection, with the shift lever placed in a low speed position or high speed position.
Figure 5B:
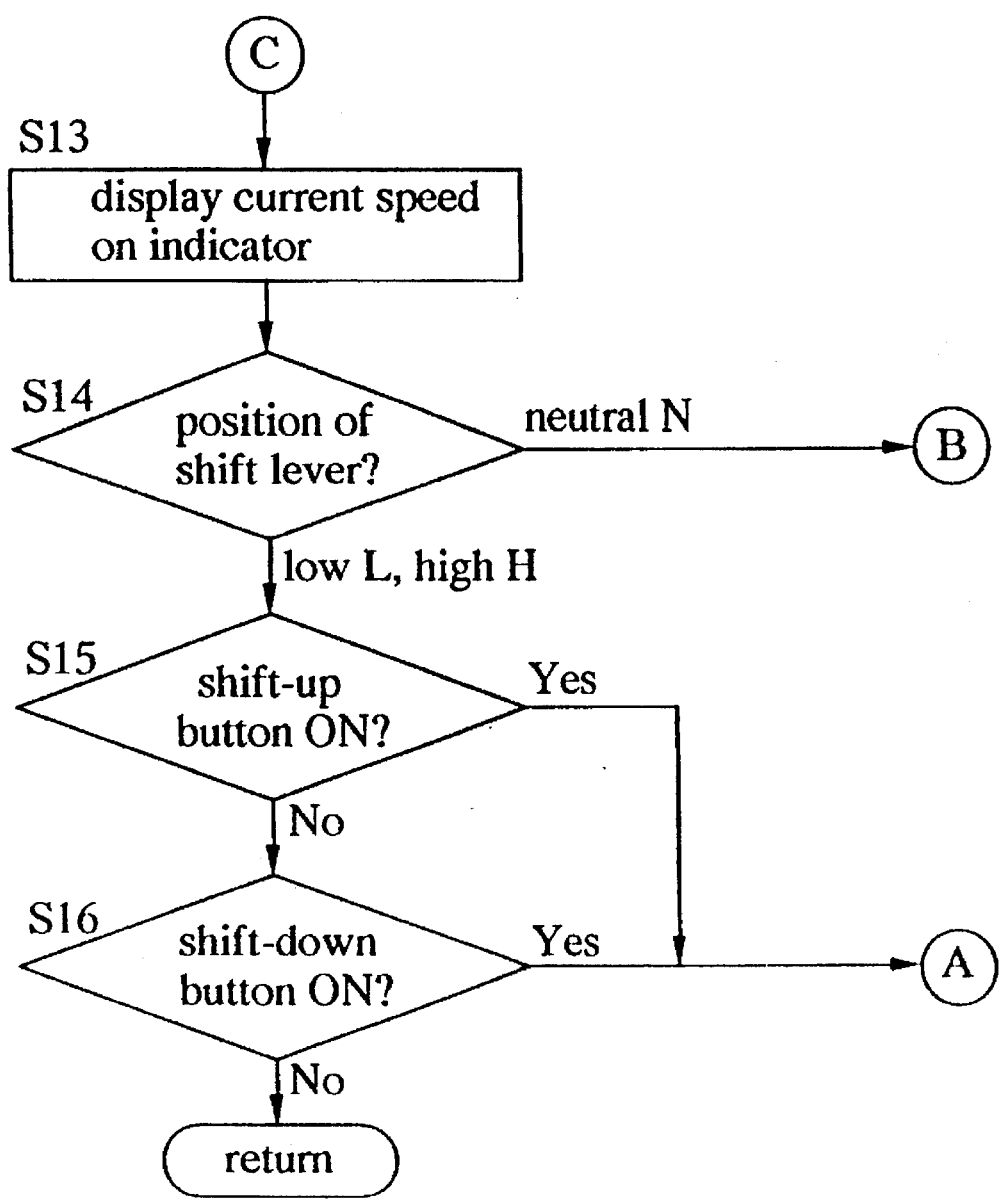

First, as shown in FIG. 5, presence or absence of an abnormality is determined for the electromagnetic proportional valve 35 which controls the forward drive and backward drive clutches 5 and 6 shown in FIG. 4 (step S1). When no abnormality is found, a control electric current is supplied to the electromagnetic proportional valve 35 (step S2).

Next, if the forward and backward drive lever 59 is in forward drive position F (step S3), a control electric current is supplied to the electromagnetic control valve 36b shown in FIG. 4 (step S5). Consequently, the changeover valve 36a is operated to the supply position to engage the forward drive clutch 5, and the forward drive lamp 65 is lit (step 6).

Conversely, if the forward and backward drive lever 59 is in backward drive position R (step S3), a control electric current is supplied to the electromagnetic control valve 37b shown in FIG. 4 (step S8). Consequently, the changeover valve 37a is operated to the supply position to engage the backward drive clutch 6, and the backward drive lamp 66 is lit (step S9). A buzzer 71 shown in FIG. 3 sounds intermittently (step S10).

If, in the above steps S1, S4 and S7, an abnormality such as a short circuit of the control electric current is detected in the electromagnetic proportional valve 35 or electromagnetic control valve 36b or 37b of forward drive and backward drive clutches 5 and 6, small letter "c" is flashed by the lower half of the speed indicator 64 shown in FIG. 3 (step S11) and buzzer 71 sounds continuously (step S12). As a result, the operator becomes aware of an abnormality occurring with the control line of forward drive and backward drive clutches 5 and 6.

As shown in FIG. 2, the main change speed device 10 is shiftable to provide four speeds, and the first auxiliary change speed device 11 shiftable to provide two speeds. Thus, the main change speed device 10 and first auxiliary change speed device 11 can in combination provide eight speeds. In this ease, when the low speed clutch 26 of the first auxiliary change speed device 11 is engaged, the first to fourth speed clutches 21–24 of the main change speed device 10 correspond to shift positions for the first to fourth speeds. When the high speed clutch 27 of the first auxiliary change speed device 11 is engaged, the first to fourth speed clutches 21–24 of the main change speed device 10 correspond to shift positions for the fifth to eighth speeds.

As shown in FIG. 4, a pressure sensor 74 is provided for each of the the first to fourth speed clutches 21–24 of the main change speed device 10 and the low speed clutch 26 and high speed clutch 27 of the first auxiliary change speed device 11, for detecting whether the working pressure thereof has reached the predetermined pressure for drive transmission. Based on detections made by the pressure sensors 74, current shift positions (first to eighth speeds) of the main and first auxiliary change speed devices 10 and 11 are determined. A shift position determined is indicated by the speed indicator 64 (step S13).

Figure 6:
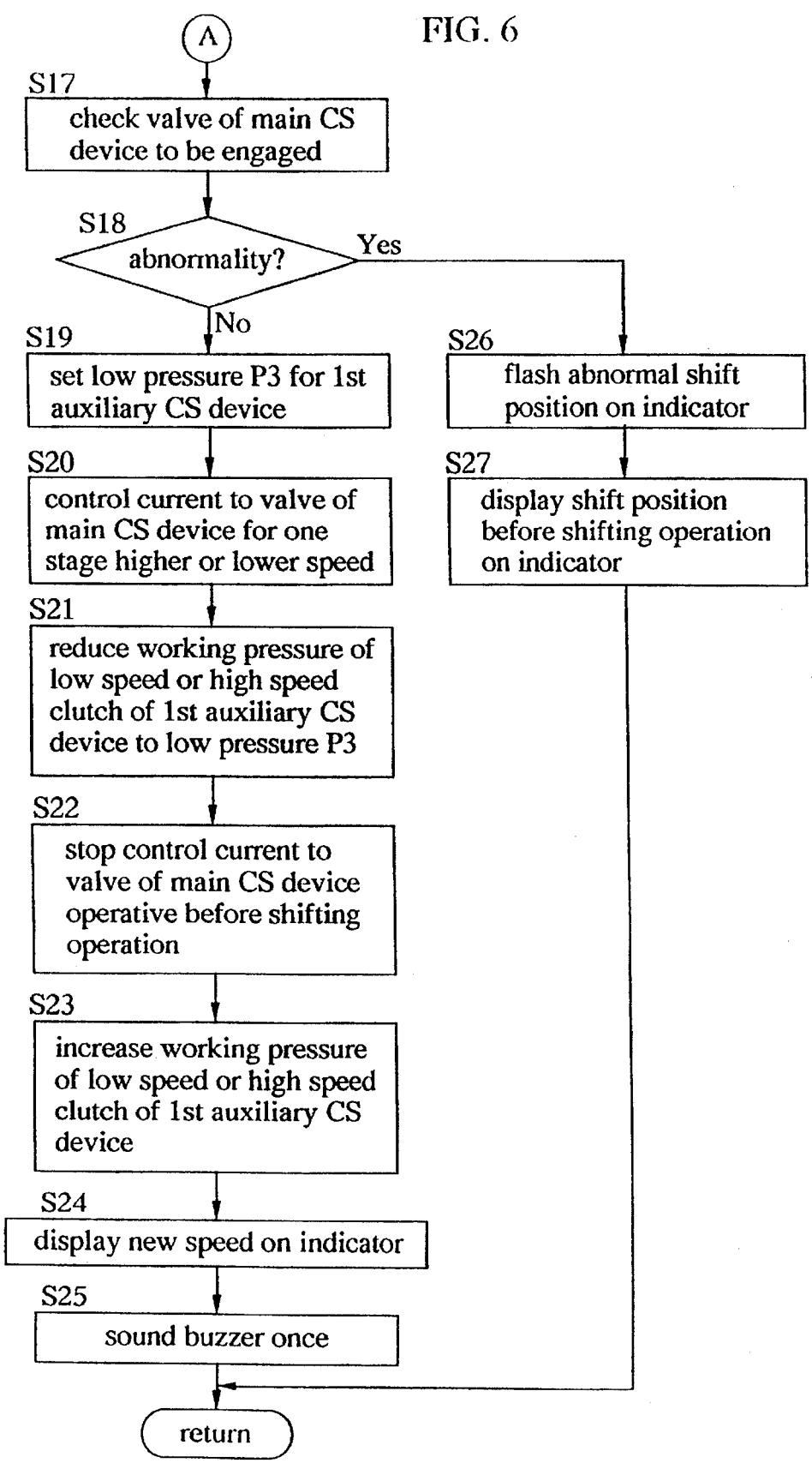
FIG. 6 is a flowchart of a second half of the control sequence for a shifting operation effected by pressing the shift-up button or shift-down button and for abnormality detection, with the shift lever placed in the low speed position or high speed position.

Next, when the shift lever 28 shown in FIG. 3 is in low speed position L or high speed position H (step S14), the shift-up button 61 or shift-down button 62 of shift lever 28 is pressed once (steps S15 and S16). If the shift-up button 61 is pressed, as shown in FIG. 6, presence or absence of an abnormality is determined for the electromagnetic control valves 31b to 34b of the main change speed device 10 in a shift position one stage higher than a current shift position. In a shifting operation from the shift position for the fourth speed to the shift position for the fifth speed, presence or absence of an abnormality is determined also for the electromagnetic proportion valve 39 for the high speed clutch 27 of the first auxiliary change speed device 11 simultaneously. Conversely, if the shift-down button 62 is pressed, presence or absence of an abnormality is determined for the electromagnetic control valves 31b to 34b of the main change speed device 10 in a shift position one stage lower than a current shift position. In a shifting operation from the shift position for the fifth speed to the shift position for the fourth speed, presence or absence of an abnormality is determined also for the electromagnetic proportion valve 39 for the low speed clutch 26 of the first auxiliary change speed device 11 simultaneously (step S17).

Operating states of the first auxiliary change sped device 11 during acceleration from the first speed to the second speed, from the second speed to the third speed and from the third speed to the fourth speed, and deceleration from the fourth speed to the third speed, from the third speed to the second speed and from the second speed to the first speed, will be described next. These accelerating and decelerating operations do no require switching of the clutches of the first auxiliary change speed device 11.

Figure 8:
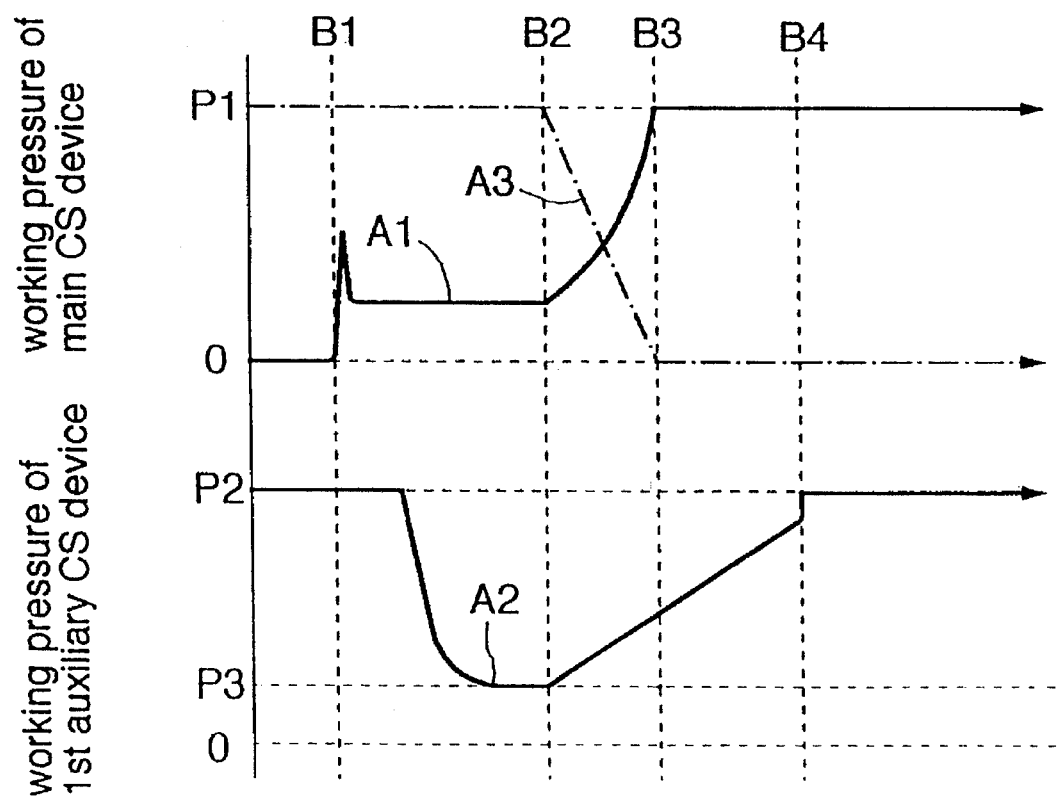
FIG. 8 is a view showing states of the main and first auxiliary change speed devices in a shifting operation effected by pressing the shift-up button or shift-down button, with the shift lever placed in the low speed position or high speed position.

If no abnormality is detected in the above state (step S18), a predetermined low pressure P3 is determined, as described later, for the low speed clutch 26 or high speed clutch 27 of the first auxiliary change speed device 11 in the engaged position as shown in FIG. 8 (step S19). When the shift-up button 61 is pressed, as shown in a solid line A1 in FIG. 8 (at point of time B1), a control electric current begins to be supplied to one of the electromagnetic control valves 31b to 34b of the main change speed device 10 corresponding to a shift position one stage higher than a current shift position. Conversely, when the shift-down button 62 is pressed, a control electric current begins to be supplied to one of the electromagnetic control valves 31b to 34b of the main change speed device 10 corresponding to a shift position one stage lower than a current shift position (step S20) (this corresponding to first control means).

At the same time, as shown in solid line A2 in FIG. 8 (at point of time B1), the electromagnetic proportion valve 38 or 39 of the low speed clutch 26 or high speed clutch 27 of the first auxiliary change speed device 11 operated to the engaged position, reduces the working pressure of low speed clutch 26 or high speed clutch 27 operated to the engaged position from operating pressure P2 for drive transmission to the above-mentioned predetermined low pressure P3 (step S21).

Next, in a shifting operation from the shift position for the fourth speed to the shift position for the fifth speed, which requires switching of the first auxiliary change speed device 11, the working pressure P2 of the low speed clutch 26 of the first auxiliary change speed device 11 is reduced to zero, and the working pressure of the high speed clutch 27 is increased from zero to the predetermined low pressure P3. Conversely, in a shifting operation from the shift position for the fifth speed to the shift position for the fourth speed, the working pressure of the high speed clutch 27 of the first auxiliary change speed device 11 is reduced to zero, and the working pressure of the low speed clutch 26 is increased from zero to the predetermined low pressure P3.

And, as shown in solid line A1 in FIG. 8 (from point of time B2 to point of time B3), the electromagnetic control valve 31b to 34b increases the working pressure of a one-stage higher or one-stage lower one of the first speed the fourth speed clutches 21–24 of the main change speed device 10 to the working pressure P1 for drive transmission. At the same time, as shown in a dot-and-dash line A3 in FIG. 8 (from point of time B2 to point of time B3), the electromagnetic control valve 31b to 34b reduces the working pressure, prior to pressing of shift-up button 61 or shift-down button 62, of the first to fourth speed clutches 21–24 of the main change speed device 10, from the working pressure P1 for drive transmission to zero (step S22) (this corresponding to the first control means).

Next, as shown in solid line A2 in FIG. 8 (from point of time B2 to point of time B4), the electromagnetic proportional valve 38 or 39 gradually increases the working pressure of low speed or high speed clutch 26 or 27 of the first auxiliary change speed device 11 maintained at the predetermined low pressure P3, until the working pressure of low speed or high speed clutch 26 or 27 reaches working pressure P2 for drive transmission (step S23). The decrease in the working pressure of the first auxiliary change speed device 11 indicated by line A2 is effected approximately 200 msec before point of time B2 at which the working pressure of the main clutch substantially starts increasing. Increase characteristics of the operating pressure of low speed or high speed clutch 26 or 27, along solid line A2 from point of time B3 to point of time B4 in FIG. 8, are predetermined relative to each shift position, such that the working pressure from point of time B2 is short time to point of time B4 increases the more sharply in a short time the closer to the shift position for the first speed.

The above completes one shifting operation started by pressing the shift-up button 61 or shift-down button 62. When the shifting operation comes to an end, a shift position resulting therefrom is indicated by the speed indicator 64 (step S24). The buzzer 71 sounds once to notify the completion of the shifting operation to the operator (step S25). The shifting operation is not carried out continuously even if the operator continues pressing the shift-up button 61 or shift-down button 62. A next shifting operation is effected only when the shift-up button 61 or shift-down button 62 is once returned and pressed again.

In the course of a normal shifting operation as noted above, an abnormality such as a short circuit of the control electric current may be found in an intended one (to which the control current is to be supplied) of the electromagnetic control valves 31b to 34b of the main change speed device 10 and electromagnetic proportional valves 38 and 39 of the first auxiliary change speed device 11, at step S18 of FIG. 6. Then, the shift position with the abnormality is indicated by the speed indicator 64, and this indication is flashed for a predetermined time (e.g. 10 seconds) (step S26).

The control current is not supplied to the intended one with the abnormality, of the electromagnetic control valve 31b to 34b and electromagnetic proportion valves 38 and 39. The speed before pressing of tie shift-up button 61 or shift-down button 62 is maintained, and the corresponding shift position is indicated by the speed indicator 64 (step S27).

(V) Shifting Operation When an Abnormalit), Is Found in Main Change Speed Device When an abnormality is found at step S18 of FIG. 6 and the shift lever 28 is in low speed position L or high speed position H, a shifting operation cannot be effected beyond a shift position with the abnormality. After returning the shift lever 28 to neutral position N, a shifting operation may be effected beyond the shift position with the abnormality. This shifting operation will be described next.

Figure 7:
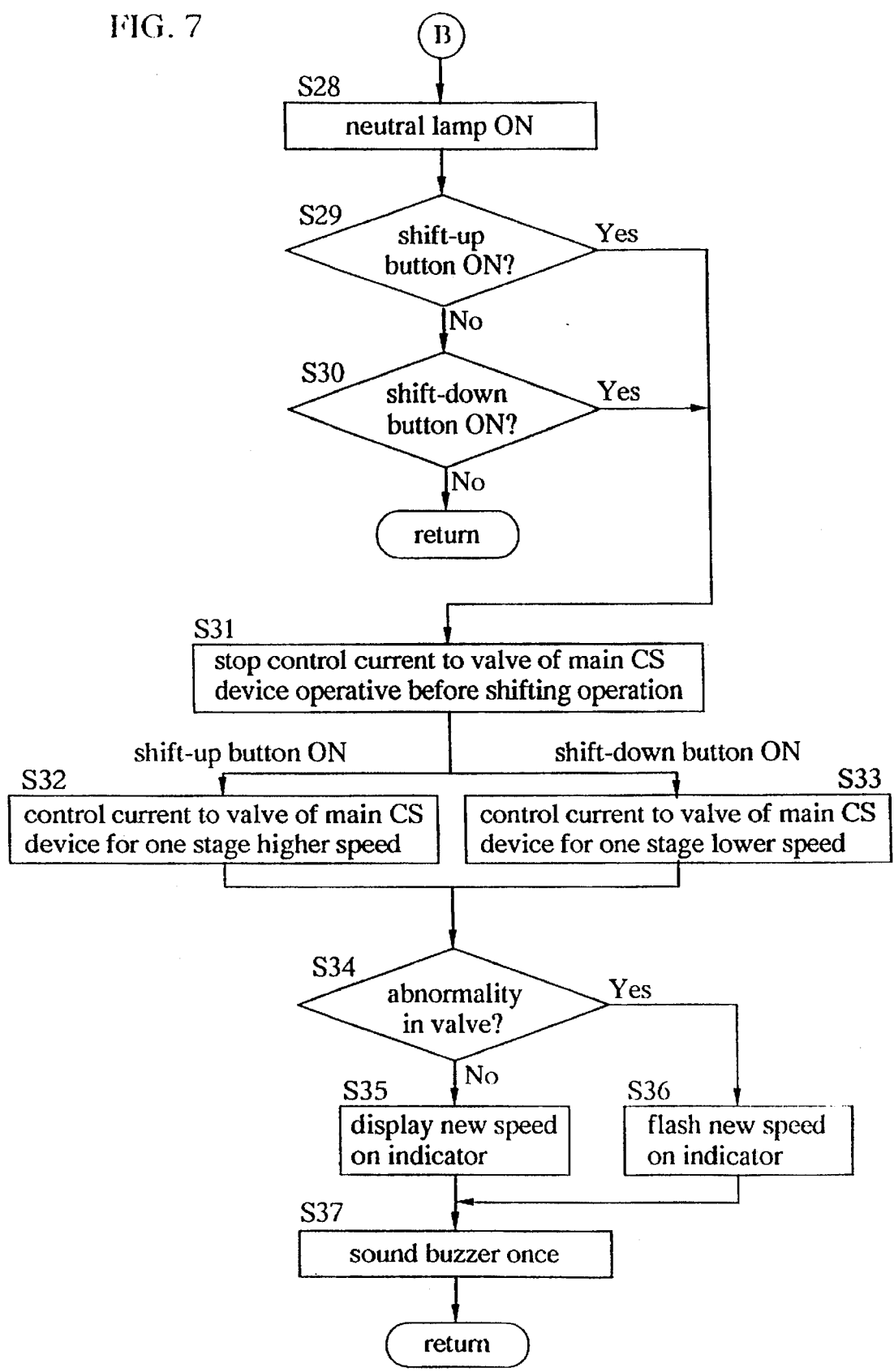
FIG. 7 is a flowchart of a control sequence for a shifting operation effected by pressing the shift-up button or shift-down button and for abnormality detection, with the shift lever placed in a neutral position.

When an abnormality is found at step S18 of FIG. 6, the operator moves the shift lever 28 from low speed position L or high speed position H to neutral position N (returning to step S14 in FIG. 5). As a result, the neutral lamp 67 of FIG. 2 is lit (moving to step S28 in FIG. 7). The shift-up button 61 or shift-down button 62 is pressed in this state (steps S29, S30). Then, the control electric current is not longer supplied to one of the electromagnetic control valves 31b to 34b which has been in the supply position (step S31). The control current is supplied to one of the electromagnetic control valves 31b to 34b corresponding to a shift position one stage higher or lower than a current shift position (steps S32, S33).

If no abnormality is found in that electromagnetic control valve 31b to 34b operative after the shifting operation, the current shift position corresponding to this electromagnetic control valve 31b to 34b is indicated by the speed indicator 64 (steps S34, S35), and the buzzer 71 sounds once (step S37). If an abnormality is found in that electromagnetic control valve 31b to 34b operative after the shifting operation, the current shift position corresponding to this electromagnetic control valve 31b to 34b is indicated and flashed by the speed indicator 64 (steps S34, S36), and the buzzer 71 sounds once (step S37).

If the shift-up button 61 or shift-down button 62 is pressed further, the operation returns from step S37 to steps S14 (FIG. 5), S28 and S29 (FIG. 7) to carry out the above shifting operation. As a result, the shifting operation is effected beyond the shift position with abnormality.

The above shifting operation is carried out continuously by continuously pressing the shift-up button 61 or shift-down button 62, with the shift lever 28 operated to neutral position N. In this state, the second auxiliary change speed device 12 in FIG. 2 is placed in neutral position. Consequently, the operation of the first auxiliary change speed device 11 shown in solid line A2 in FIG. 8 is not effected, except a shifting operation between the shift position for the fourth speed and the shift position for the fifth speed.

(VI)

The states in the above sections (IV) and (V) will be described more particularly. Assume, for example, that an abnormality is found in the shift position for the third speed when a shift is made from the shift position for the second speed to the shift position for the third speed. When the shift-up button 61 is pressed, the speed indicator 64 changes indication from the shift position for the second speed to the shift position for the third speed. The indication of the shift position for the third speed is flashed. Consequently, the operator notices that an abnormality has occurred with the shift position for the third speed. The speed indicator 64 then indicates the shift position for the second speed again. The shift position for the second speed remains an actual shift position.

Conversely, an abnormality may be found in the shift position for the third speed when a shift is made from the shift position for the fourth speed to the shift position for the third speed. When the shift-down button 62 is pressed, the speed indicator 64 changes indication from the shift position for the fourth speed to the shift position for the third speed. The indication of the shift position for the third speed is flashed. Consequently, the operator notices that an abnormality has occurred with the shift position for the third speed. The speed indicator 64 then indicates the shift position for the fourth speed again. The shift position for the fourth speed remains an actual shift position.

Next, the shift lever 28 is moved from low speed position L or high speed position H to neutral position N. When the shift-up button 61 is pressed in this state, the speed indicator 64 changes indication from the shift position for the second speed to the shift position for the third speed, and flashes the indication of the shift position for the third speed. If the shift-up button 61 is pressed further, the speed indicator 64 indicates the shift position for the fourth speed. The shift position for the fourth speed remains an actual shift position.

Conversely, if the shift-down button 62 is pressed, the speed indicator 64 changes indication from the shift position for the fourth speed to the shift position for the third speed, and flashes the indication of the shift position for the third speed. If the shift-down button 62 is pressed further, the speed indicator 64 indicates the shift position for the second speed. The shift position for the second speed remains an actual shift position.

(VII) Setting of Low Pressure P3 of First Auxiliary Change Speed Device

Setting of low pressure P3 at step S19 in FIG. 6 for the low speed or high speed clutch 26 or 27 of the first auxiliary change speed device 11 will be described next.

Figure 9:
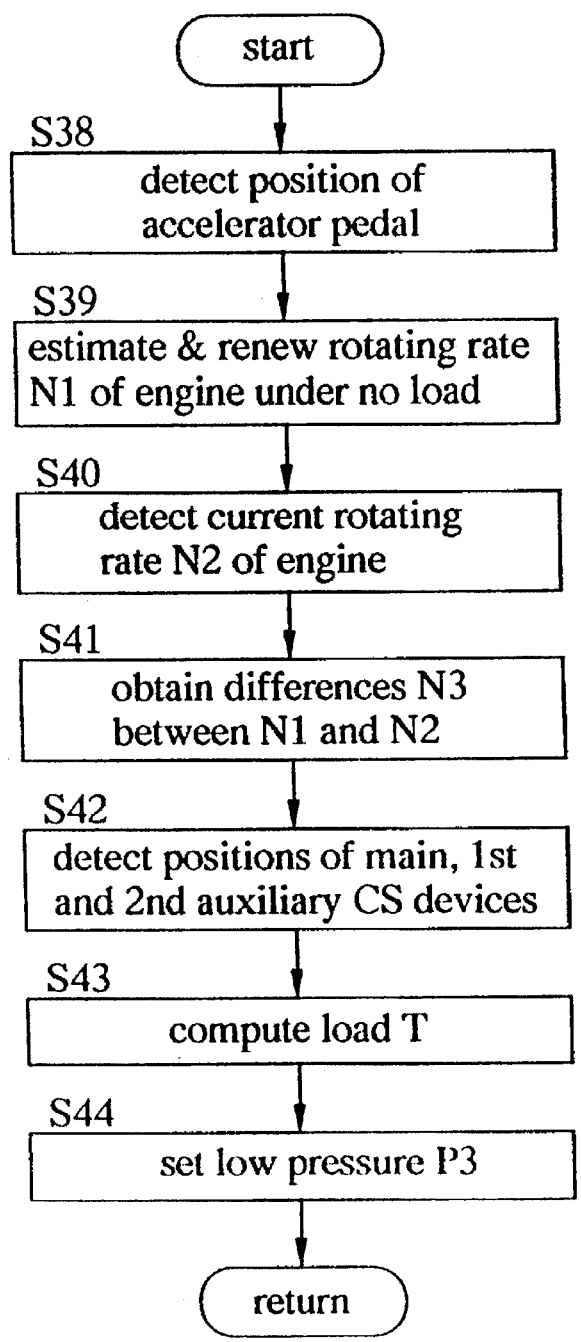
FIG. 9 is a flowchart of setting of a predetermined low pressure (P3) for the first auxiliary change speed device in the condition shown in FIG. 8.
Figure 10:
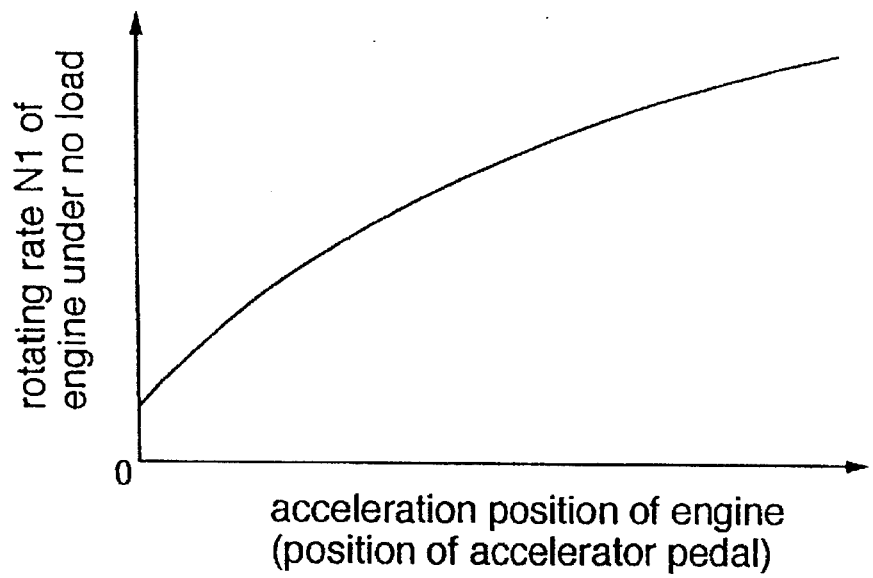
FIG. 10 is a view showing a relationship between accelerator position and engine speed in no-load condition in time of setting of the predetermined low pressure (P3) for the first auxiliary change speed device in the condition shown in FIG. 8.

As shown in FIG. 9, the position sensor 70 detects a current position of accelerator pedal 69 (step S38). Engine speed N1 in no-load condition corresponding to the current position of accelerator pedal 69 (accerelating position of engine 1) is estimated from FIG. 9, and this engine speed N1 is stored (step S39).

Next, an engine speed sensor 72 shown in FIGS. 2 and 3 detects current engine speed N2 of engine 1 (step S40). A difference N3 between engine speed N1 in no-load condition and current engine speed N2 is calculated (step S41). Current shift positions of the main change speed device 10 and the first and second auxiliary change speed devices 11 and 12 (one of the first to 16th speeds) (before pressing of the shift-up button 61 or shift-down button 62) are detected (step S42).

Figure 11:
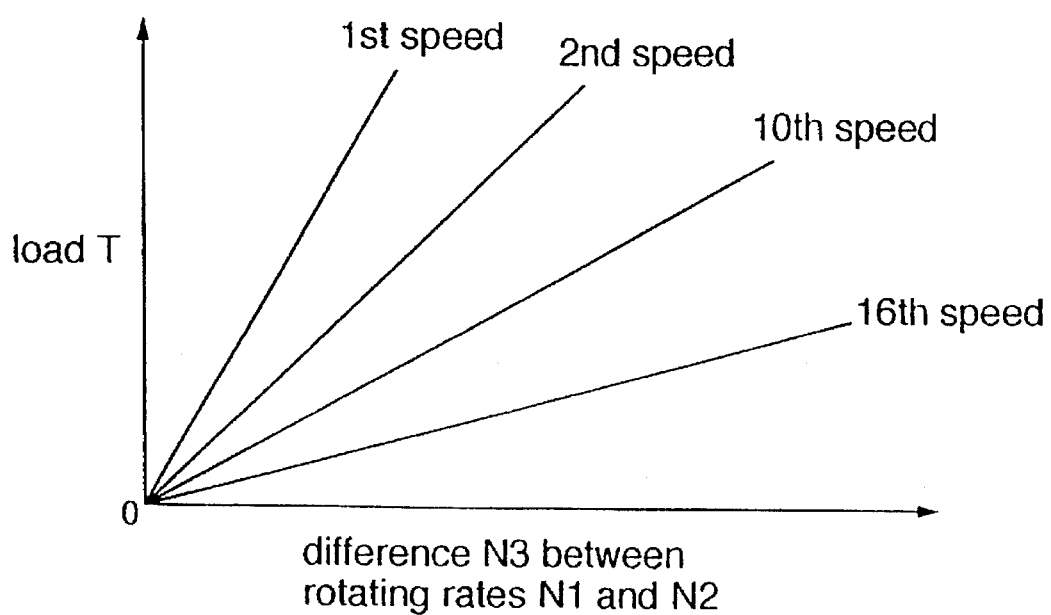
FIG. 11 is a view showing a relationship between loads applied to the engine and a difference between engine speed in no-load condition and current engine speed in time of setting of the predetermined low pressure (P3) for the first auxiliary change speed device in FIG. 8.

A load T acting on the engine 1 is determined from difference N3 between engine speeds N1 and N2 and the current shift position (one of the first to 16th speeds) as shown in FIG. 11 (step S43). Low pressure P3 is set at step S19 in FIG. 6 and as shown in solid line A2 in FIG. 8, based on this load T (step S44).

As shown in FIG. 11, it is determined that the greater the difference N3 is between engine speed N1 in no-load condition and current engine speed N2, the greater load acts on the engine 1. Then, the low pressure P3 in solid line A2 in FIG. 8 is set to be high (i.e. close to working pressure P2 for drive transmission). Conversely, the smaller is the difference N3, the smaller load acts on the engine 1. Then, the low pressure P3 in solid line A2 in FIG. 8 is set to be low (i.e. close to zero). As shown in FIG. 11, it is determined that the closer the current position is toward the position for the first speed, the greater load acts on the engine 1. Then, the low pressure P3 in solid line A2 in FIG. 8 is set to be high (i.e. close to working pressure P2 for drive transmission).

In this way, low pressure P3 is repeatedly set and renewed. When the operation reaches step S19 in FIG. 5, the latest low pressure P3 stored in memory is adopted.

(VIII) Operation of Shift Lever to Neutral, Low Speed and High Speed Positions

The operation of shift lever 28 shown in FIG. 3 to neutral position N, low speed position L and high speed position H will be described next.

As described in section (III) above, the shift lever 28 is fixed by the lock pin 56 to neutral position N, low speed position L or high speed position H. For operating the shift lever 28 to a different position, the control pin 57 of shift lever 28 must be pressed to undo the lock pin 56.

Figure 12:
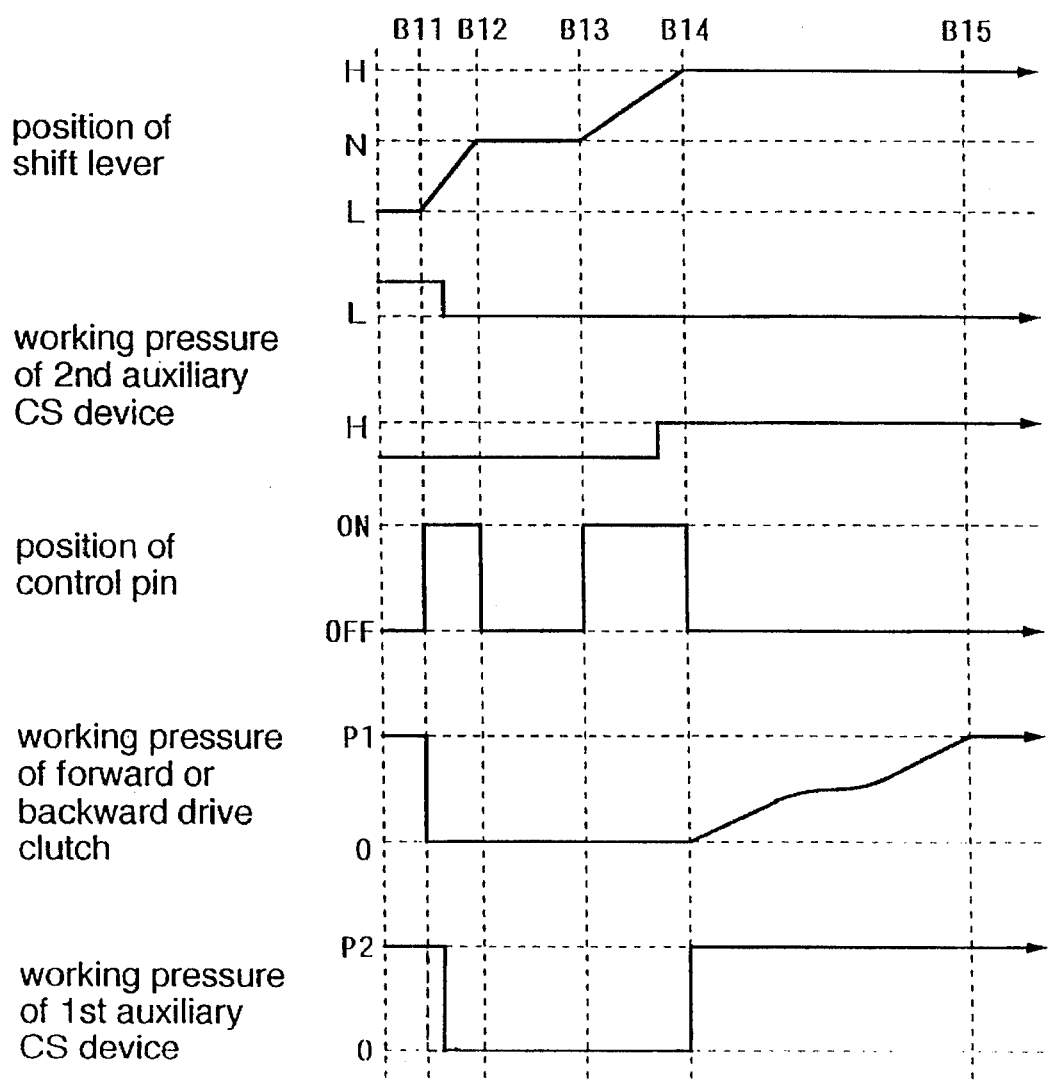
FIG. 12 is a view showing states of a forward drive or backward drive clutch and the first auxiliary change speed device when the second auxiliary change speed device is shifted by shift lever and and a control pin.

As shown in FIG. 12, the lock pin 56 becomes disengaged from the guide plate 60 when, with the shift lever 28 in low speed position L, for example, the control pin 57 is pressed (ON) (point of time B11). At the same time, the electromagnetic control valve 36b or 37b is operated by a control signal from the control pin 57 (control electric current I supplied to the electromagnetic proportional valve 35 in FIG. 4), to disengage the forward drive or backward drive clutch 5 or 6. The control signal from the control pin 57 operates also the electromagnetic proportional valve 38 or 39 of the first auxiliary change speed device 11 to disengage the low speed or high speed clutch 26 or 27.

With the control pin 57 pressed the shift lever 28 is moved from low speed position L to neutral position N. In this case, as shown in FIG. 2, the first auxiliary change speed device 11 immediate upstream of the second auxiliary change speed device 12 shifted by the shift lever 28 is in the disengaged position. It is therefore possible for the shift lever 28 to be moved to neutral position N easily.

The control pin 57 is released after the shift lever 28 is returned to neutral position N (OFF) (point of time B12). Then the shift lever 28 is locked to neutral position N by the lock pin 56. The forward drive or low speed of backward drive clutch 5 or 6 and the low speed or high speed clutch 26 or 27 of the first auxiliary change speed device 11 are maintained in the disengaged positions.

Next, the control pin 57 is pressed while the shift lever 28 is in neutral standstill position N (ON) (point of time B13). Then, the lock pin 56 becomes disengaged from the guide plate 60 as described above. At this time, however, the forward drive or backward drive clutch 5 or 6 and the low speed or high speed clutch 26 or 27 of the first auxiliary change speed device 11 are maintained in the disengaged positions.

Consequently, the shift lever 28 may easily be operated, for example, from neutral standstill position N to high speed position H, with the control pin 57 pressed, since the first auxiliary change speed device 11 immediately upstream of the second auxiliary change speed device 12 remains disengaged.

The control pin 57 is released after the shift lever 28 is moved to high speed position H (OFF) (point of time B14).

Then the shift lever 28 is locked to high speed position H by the lock pin 56. At the same time, the electromagnetic proportional valve 38 or 39 engages the low speed or high speed clutch 26 or 27 of the first auxiliary change speed device 11. On the other hand, the forward drive or backward drive clutch 5 or 6 is gradually operated to the engaged position as described hereinafter.

As shown in FIG. 2, a rotation sensor 73 is provided for detecting a rotating rate of sleeve shaft 7 disposed between the forward drive and backward drive clutches 5, 6 and the main change speed device 10. The electromagnetic proportion valve 35 in FIG. 4 increases the working pressure of the forward drive or backward drive clutch 5 or 6, from point of time B14 at which the control pin 57 is returned, in such a way that a rate of increase of a detection value of the rotation sensor 73 does not exceed a set value (point of time B15).

Assume further that the clutch pedal 52 shown in FIGS. 3 and 4 is depressed to place the forward drive or backward drive clutch 5 or 6 in half-clutch state through the switch valve 51. As shown in FIG. 2, the sensors 72 and 73 are arranged downstream and upstream of the forward drive and backward drive clutches 5 and 6. Thus, the power of engine 1 absorbed by the forward drive or backward drive clutch 5 or 6 is derived from a difference in detection value between the two sensors 72 and 73. When an accumulated value of the power absorbed reaches a set value, it is determined that the forward drive or backward drive clutch 5 or 6 will be seized. Then, the buzzer 71 is operated to sound intermittently at short intervals to notify the situation to the operator.

(IX) Structure for Attaching Door Panel of Cab

Figure 14:
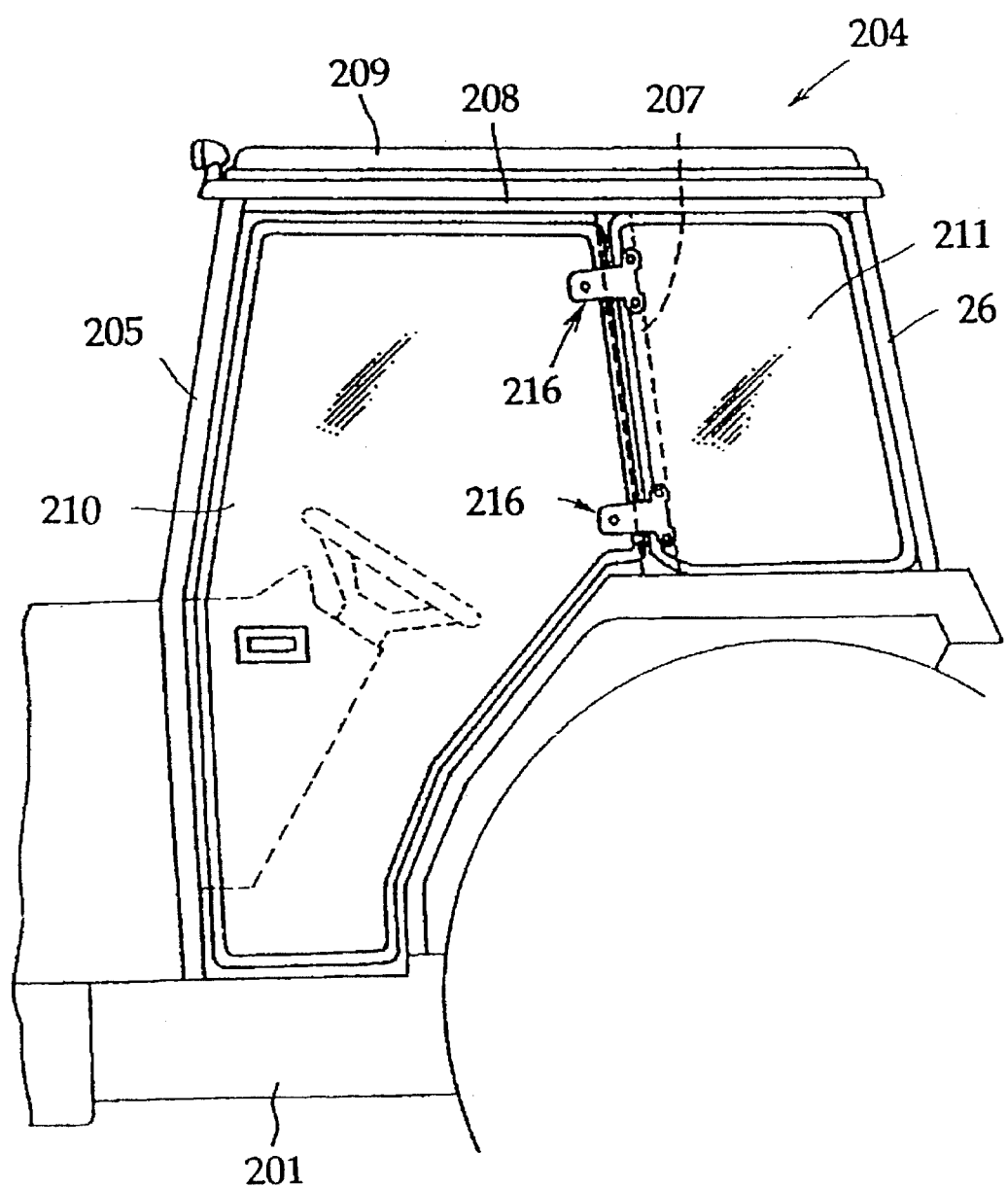
FIG. 14 is a side view of a cab.

In FIG. 14, numeral 201 denotes a tractor body having a cab 204 mounted on a rear portion thereof. The cab 204 includes a cab frame having, at right and left sides, front props 206, rear props 206, intermediate props 207 arranged therebetween, and an upper frame 208 interconnecting upper ends of the right and left front props 205, upper ends of the right and left rear props 206, and the upper ends of front and rear props 205 and 206.

The upper frame 208 supports a roof 209. An entrance is defined between the front prop 205 and intermediate prop 207 at each side. The entrance at each side is closed by a door panel 210 formed of transparent glass. A rear window is defined between the intermediate prop 207 and rear prop 206 at each side. The rear window at each side is closed by a side panel 211 formed of transparent glass.

Figure 15:
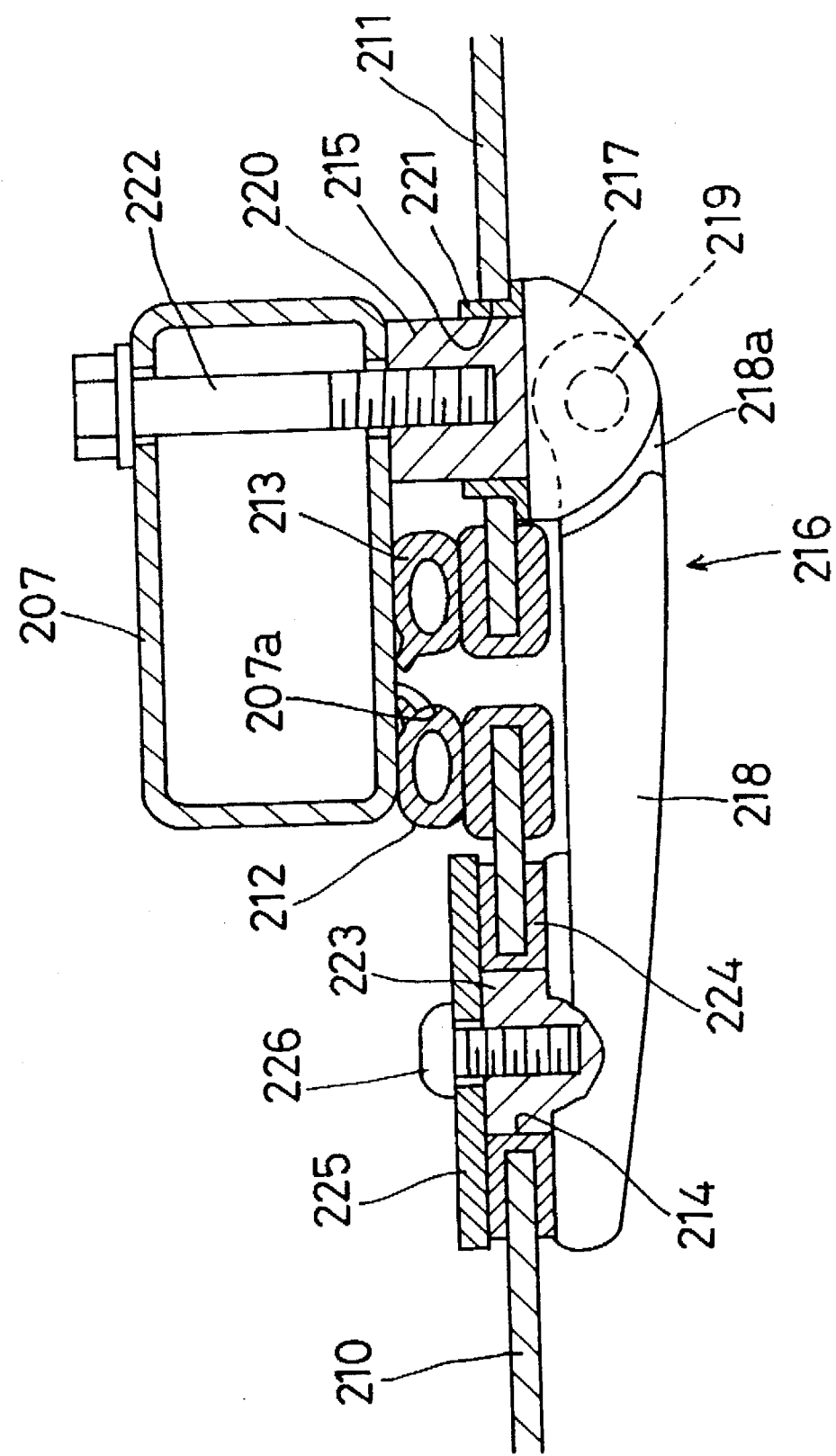
FIG. 15 is a cross section of a door panel connection.

As shown in FIG. 15, seals 212 and 213 are fixedly fitted over entire outer edges of each door panel 210 and each side panel 211. Each door panel 210 has perforations 214 formed in upper and lower positions adjacent a rear edge thereof. Each side panel 211 has pairs of upper and lower perforations 215 formed in upper and lower positions adjacent a front edge thereof.

Figure 16:
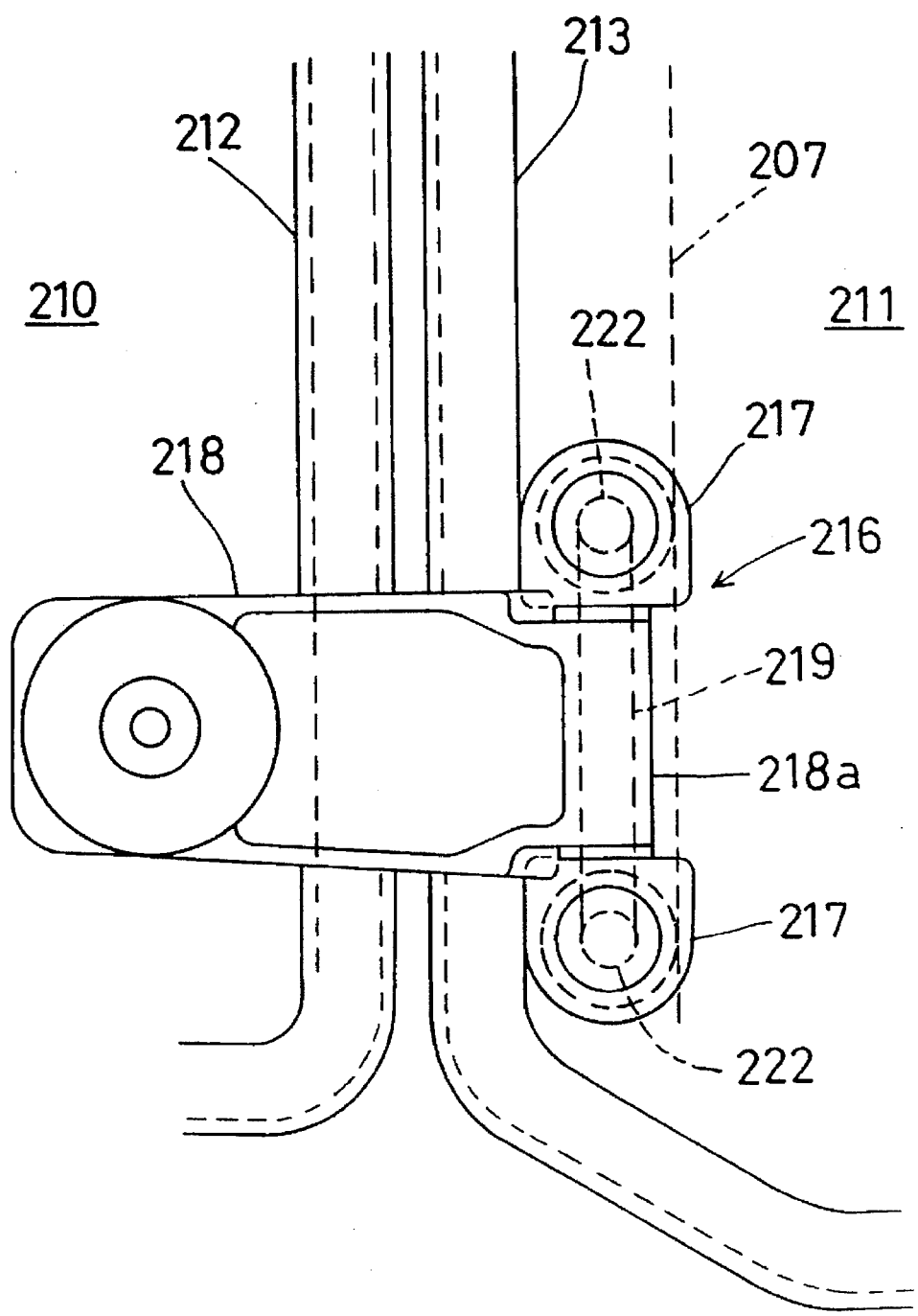
FIG. 16 is a side view of the door panel connection.
Figure 17:
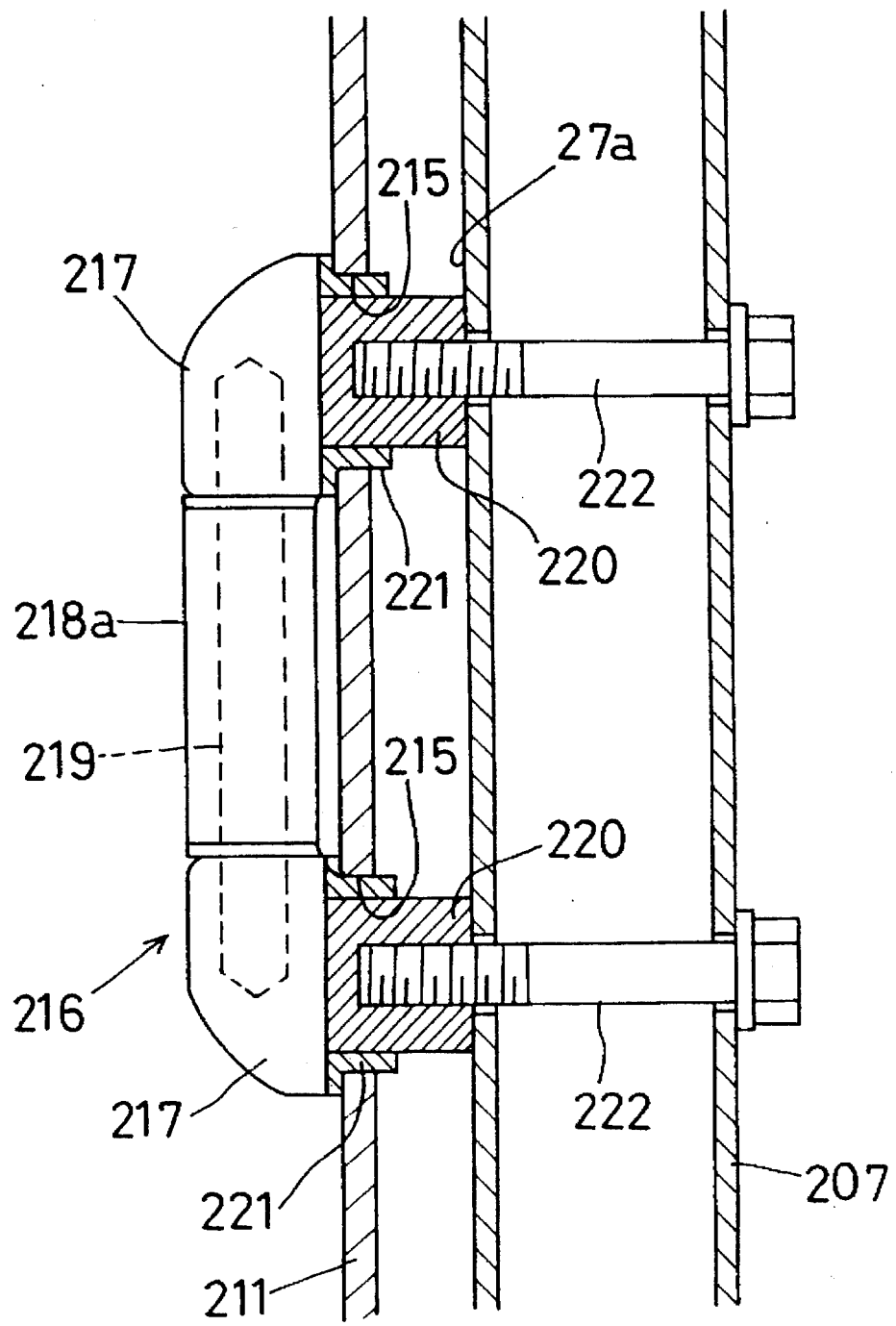
FIG. 17 is a sectional rear view of door panel connection.

As shown in FIGS. 15 through 17, each intermediate prop 207 has a flat outer surface 207a. An upper portion of the rear edge of door panel 210 and the front edge of side panel 211, with little space therebetween, contact a forward portion of the outer surface 207a through seals 212 and 213.

Each intermediate prop 207 has hinges 216 arranged in upper and lower positions on the outer surface thereof. Each hinge 216 includes a pair of upper and lower support portions 217, and a pivotal piece 218 supported at a proximal end 218a thereof between the upper and lower support portions 217 to be pivotable about a vertical pivotal axis 219.

Each of the upper and lower support portions 217 defines a nut 220 projecting therefrom. This nut 220 extends from an outer surface of the side panel 211 through one of the perforations 215 adjacent the front edge of side panel 211, with a bush 221 mounted between the nut 220 and perforation 215. The nut 220 contacts a rearward position on the outer surface 207a of intermediate prop 207. A bolt 222 extending transversely through the intermediate prop 207 from inside the cab is screwed into a threaded bore of the nut 220. Thus, the hinge 216 is mounted on the outer surface of side panel 211 and fixed to the intermediate prop 207.

The pivotal piece 218 also has a nut 223 projecting from a transversely inward surface thereof. This nut 223 extends from an outer surface of the door panel 210 through one of the perforations 21 4 adjacent the rear edge of door panel 210, with a bush 224 of U-shaped section mounted between the nut 223 and perforation 214 The nut 223 contacts a contact plate 225 disposed on an inner surface of door panel 210. A screw 226 extending through the contact plate 225 from inside the cab is screwed into a threaded bore of the nut 223. Thus, the door panel 210 is pivotable about the pivotal axes 219 of hinges 216.

Figure 18:
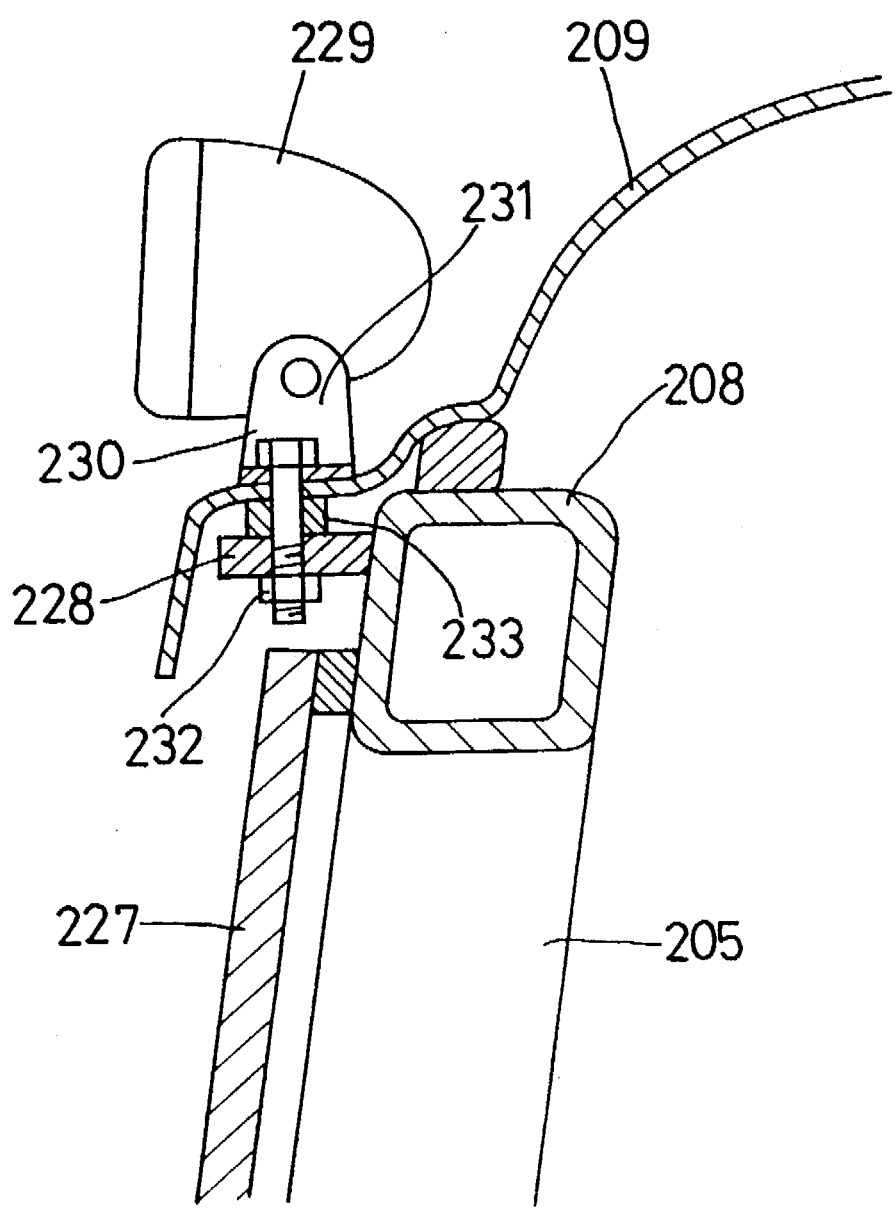
FIG. 18 is side surface cross section of a working lamp connection.

As shown in FIG. 18, a windshield 227 is mounted between the right and left front props 205. The upper frame 208 fixedly supports a bracket 228 projecting forward from a front end thereof. A stay 230 of a working lamp 229 is fixed by a bolt 231 and nut 232 to this bracket 228. A front wall 209a of roof 209 is fixed between the stay 230 of working lamp 229 and an interposition element 233 on the bracket 228.

Figure 19:
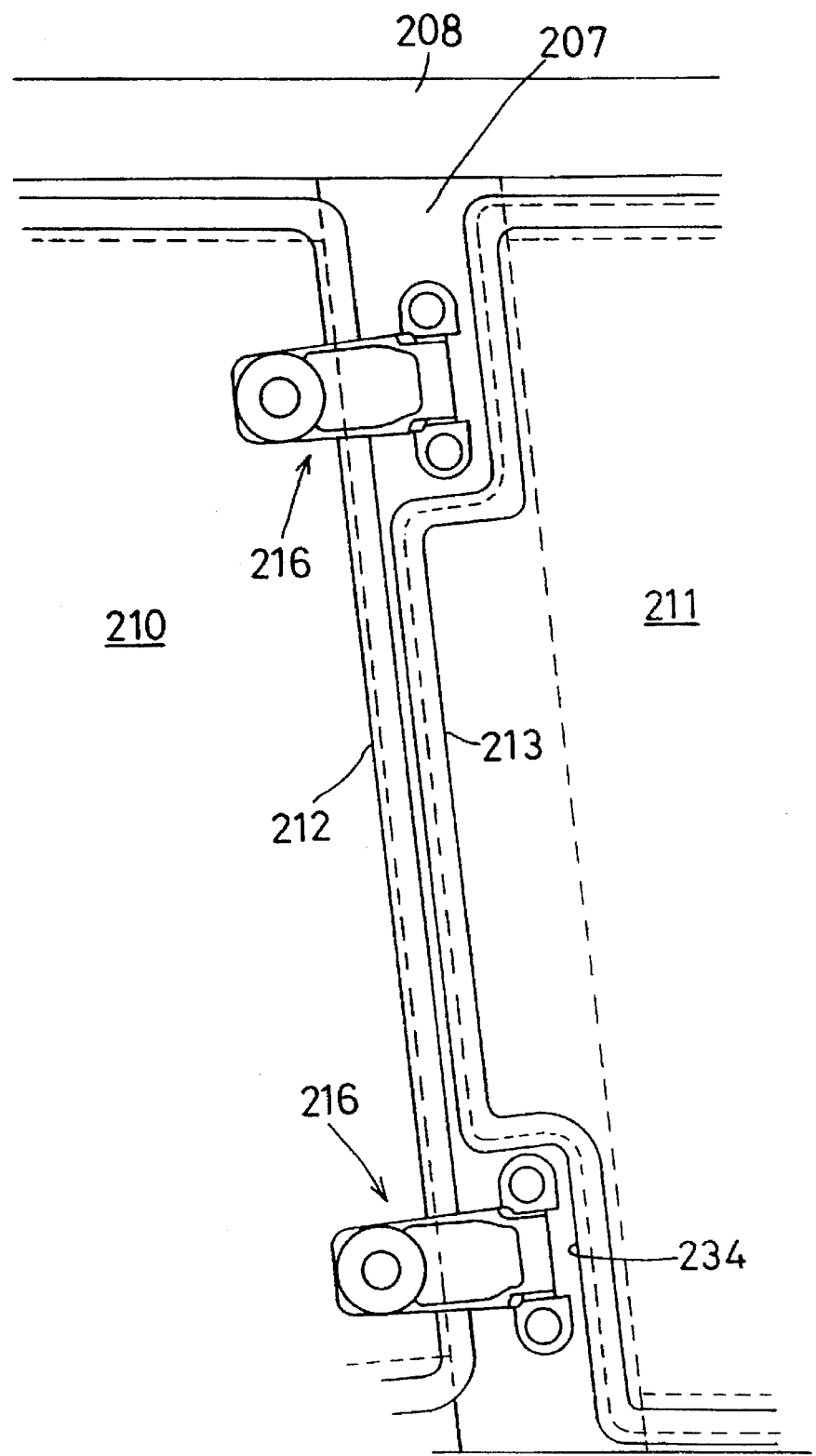
FIG. 19 is a side view of a modified door panel connection.

In addition to the door panel attaching structure described above, as shown in FIG. 19, cutouts 234 corresponding to the hinges 216 may be in upper and lower positions adjacent the front edge of each side panel 211. These cutouts 234 allow a reduction in the spacing between the upper portion of the rear edge of door panel 210 and a portion of the front edge of side panel 211 between the upper and lower hinges 216.

The reduced spacing between the rear edge of door panel 210 and the front edge of side panel 211 provides the advantages that, when the tractor is washed, inner surfaces of seals 212 and 213 are protected from damage due to exposure to high-pressure water, and the cab interior sealed off against water. These advantages are realized even though the intermediate props 207 have flat outer surfaces 207a.

Other Embodiments

Figure 13:
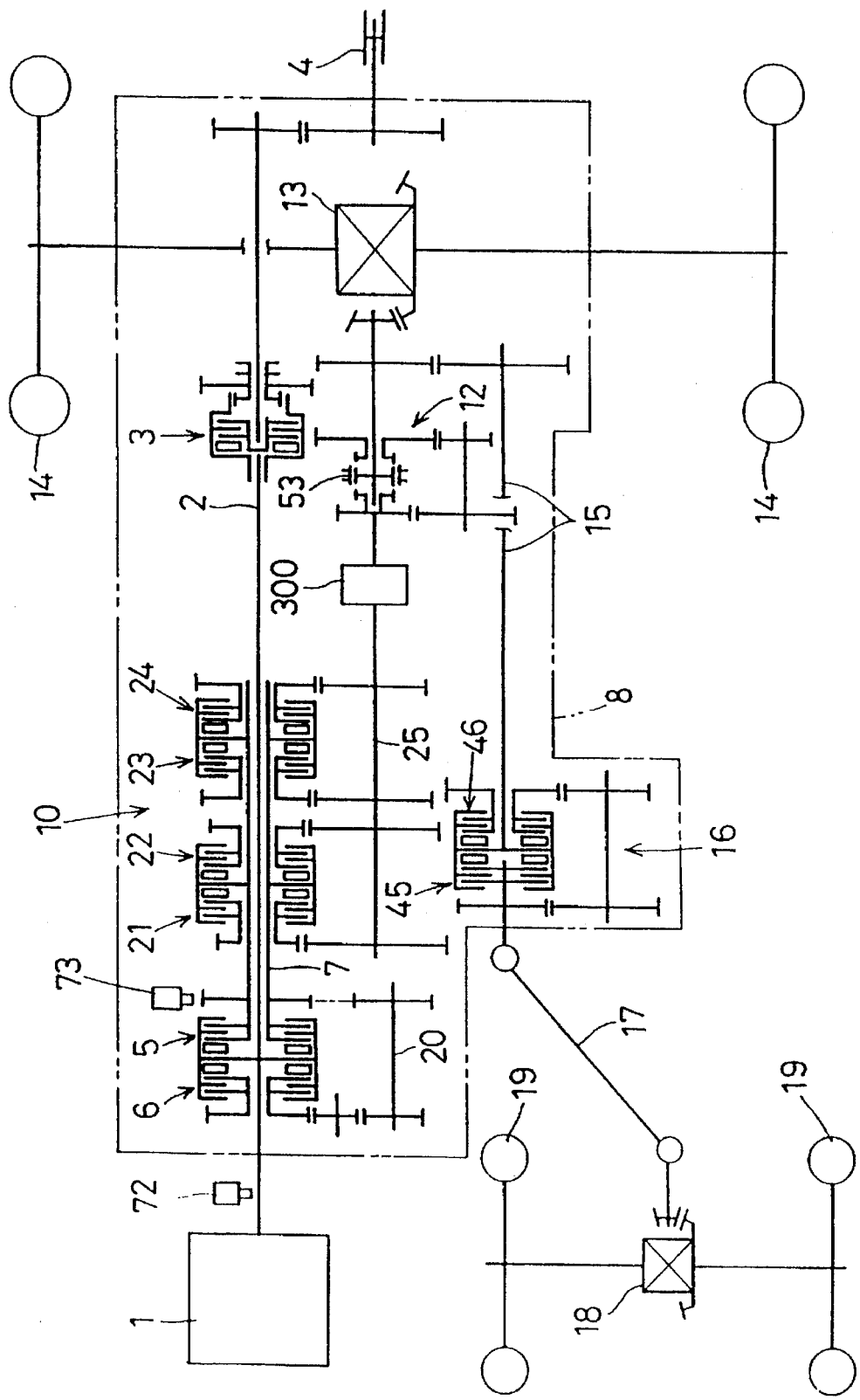
FIG. 13 is a schematic view of a modified transmission system in the transmission case.

As shown in FIG. 13, an auxiliary clutch 300 may be provided in place of the first auxiliary change speed device 11 in the above embodiment, to be operable by an electromagnetic proportional valve (corresponding to a second control valve). This construction enables a smooth shifting operation as described in the foregoing embodiment.

That is, when the shift-up button 61 or shift-down button 62 is pressed, the control valve controls the auxiliary clutch 301) with the same characteristics as those of the first auxiliary change speed device 11 shown in the lower half of FIG. 8. This embodiment also includes a main change speed device 100 which may provide the number of speeds corresponding to the combination of main change speed device 10 and first auxiliary change speed device 11 in the foregoing embodiment.

The embodiment of FIG. 3 has separate shift-up button 61 and shift-down button 62. Instead, one shift switch (not shown) may be provided, which is operable to a shift-up position and a shift-down position to transmit a shift-up signal and a shift-down signal. The main change speed device 10 and first auxiliary change speed device 11 shown in FIGS. 2 and 4, instead of being the hydraulic clutch type, may be the change speed gearing type similar to the second auxiliary change speed device 12, each with a shift member slidable by a hydraulic cylinder. In this case, the forward drive or backward drive clutch 5 or 6 may be disengaged automatically by the shift-up signal or shift-down signal, and engaged automatically by the hydraulic cylinder.

What is claimed is:

1. A drive transmission system for a working vehicle for transmitting power of an engine to running devices through a main clutch, a main change speed device and an auxiliary change speed device, said main change speed device including a first group of hydraulic clutches, and a first group of control valves for operating these clutches, said auxiliary change speed device including a second group of hydraulic clutches, and a second group of control valves for operating these clutches, pressure oil being supplied to selected clutches of said first group of hydraulic clutches and said second group of hydraulic clutches to obtain a desired speed, said drive transmission system comprising:

(A) shifter means for transmitting a shift command to said main change speed device and said auxiliary change speed device;

(B) first control means operable in response to said shift command to operate at one point of time, to a drain position, one of said first group of control valves placed in a supply position prior to transmission of said shift command, and to operate at a point of time which is earlier than said one point of time, to a supply position, a different one of said first group of control valves corresponding to said shift command; and (C) second control means operable in response to said shift command to operate at a point of time which is earlier than said one point of time, to a drain position, one of said second group of control valves placed in a supply position, and thereafter to operate said one of said second group of control valves gradually to a supply position, and wherein said second control means is operable in response to said shift command to reduce a working pressure of said second group of hydraulic clutches to a predetermined low pressure when said one of said second group of control valves is operated to said drain position, and wherein said auxiliary change speed device is positioned downstream of said main change speed device and upstream of said running devices with respect to an engine power transmission line.

2. A drive transmission system for a working vehicle for transmitting power of an engine to running devices through a main clutch, a main change speed device and an auxiliary change speed device, said main change speed device including a first group of hydraulic clutches, and a first group of control valves for operating these clutches, said auxiliary change speed device including a second group of hydraulic clutches, and a second group of control valves for operating these clutches, pressure oil being supplied to selected clutches of said first group of hydraulic clutches and said second group of hydraulic clutches to obtain a desired speed, said drive transmission system comprising:

(A) shifter means for transmitting a shift command to said main change speed device and said auxiliary change speed device;

(B) first control means operable in response to said shift command to operate, to a drain position, one of said first group of control valves placed in a supply position prior to transmission of said shift command, and to operate, to a supply position, a different one of said first group of control valves corresponding to said shift command;

(C) second control means operable in response to said shift command to operate, to a drain position, one of said second group of control valves placed in a supply position, and thereafter to operate said one of said second group of control valves gradually to a supply position, and wherein said second control means is operable in response to said shift command to reduce a working pressure of said second hydraulic clutches to a predetermined low pressure when said one of said second group of control valves is operated to said drain position;

(D) detection means including:
an accelerator pedal sensor for detecting a position of an accelerator pedal;
a rotation sensor for detecting a current rotating rate of said engine;
a rotation difference detector for detecting a difference between a rotating rate of said engine in no-load condition corresponding to a detection value of said accelerator pedal sensor and said current rotating rate of said engine; and (E) third control means for setting said predetermined low pressure of said hydraulic clutch reduced by said second control means in response to said difference detected by said rotation difference detector.

3. A drive transmission system for a working vehicle for transmitting power of an engine to running devices through a main clutch, a main change speed device and an auxiliary change speed device, said main change speed device including a first group of hydraulic clutches, and a first group of control valves for operating these clutches, said auxiliary change speed device including a second group of hydraulic clutches, and a second group of control valves for operating these clutches, pressure oil being supplied to selected clutches of said first group of hydraulic clutches and said second group of hydraulic clutches to obtain a desired speed, said drive transmission system comprising:

shifter means for transmitting a shift command to said main change speed device and said auxiliary change speed device;

first control means operable in response to said shift command to operate, to a drain position, one of said first group of control valves placed in a supply position prior to transmission of said shift command, and to operate, to a supply position, a different one of said first group of control valves corresponding to said shift command;

second control means operable in response to said shift command to operate, to a drain position, one of said second group of control valves placed in a supply position, and thereafter to operate said one of said second group of control valves gradually to a supply position;

a second auxiliary change speed device disposed downstream of said auxiliary change speed device, which is switchable between low speed, neutral and high speed positions;

a shift lever mechanically interlocked to said second auxiliary change speed device for operating said second auxiliary change speed device to one of said three positions;

a lock controller for locking and unlocking said shift lever to/from positions corresponding to said three positions; and a main clutch control means for operating said main clutch to a disengaged position by draining pressure oil therefrom when said lock controller is in an unlocking position, and for operating said main clutch to an engaged position by supplying pressure oil thereto when said lock controller is in a locking position.

4. A drive transmission system as defined in claim 3, wherein said control means is operable, when said lock controller is in said unlocking position, to operate, to a drain position, one of said second group of control valves of said auxiliary change speed device placed in a supply position.

5. A drive transmission system as defined in claim 3, wherein said shift means includes press-button switches attached to said shift lever.

6. A drive transmission system for a working vehicle for transmitting power of an engine to running devices through a main clutch, a main change speed device and an auxiliary change speed device, said main change speed device including a first group of hydraulic clutches and a first group of control valves for operating these clutches, said auxiliary change speed device including a second group of hydraulic clutches and a second group of control valves for operating these clutches, pressure oil being supplied to selected clutches of said first group of hydraulic clutches and said second group of hydraulic clutches to obtain a desired speed, said drive transmission system comprising:

shifter means for transmitting a shift command to said main change speed device and said auxiliary change speed device, wherein said shift means includes a shift-up button for shifting said main change speed device to an accelerating position, and a shift-down button for shifting said main change speed device to a decelerating position;

first control means operable in response to said shift command to operate, to a drain position, one of said first group of control valves placed in a supply position prior to transmission of said shift command, and to operate, to a supply position, a different one of said first group of control valves corresponding to said shift command; and second control means operable in response to said shift command to operate, to a drain position, one of said second group of control valves placed in a supply position, and thereafter to operate said one of said second group of control valves gradually to a supply position.

7. A drive transmission system for a working vehicle for transmitting power of an engine to running devices through a main clutch, a main change speed device and an auxiliary clutch, said main change speed device including a first group of hydraulic clutches, a group of control valves for operating these clutches, and a second control valve for operating said auxiliary clutch, said auxiliary clutch being disposed between said running devices and said main change speed device, pressure oil being supplied to a selected one of said first group of said hydraulic clutches to obtain a desired speed, said drive transmission system comprising:

(A) shifter means for transmitting shift command to said main change speed device;

(B) first control means operable in response to said shift command to operate at one point of time, to a drain position, one of said first group of control valves placed in a supply position prior to transmission of said shift command, and to operate at a point of time which is earlier than said one point of time, to a supply position, a different one of said first group of control valves corresponding to said shift command; and (C) second control means operable in response to said shift command to operate at a point of time which is earlier than said one point of time said second control valve gradually to a supply position.

8. A drive transmission system as claimed in claim 1 further comprising:
third control means for setting said predetermined low pressure reduced by said second control means in response to an engine load.

* * * * *